US012712442B2

(12) United States Patent
Huber et al.

(10) Patent No.: US 12,712,442 B2
(45) Date of Patent: Aug. 18, 2026

(54) THREE-PHASE MULTI-LEVEL BOOST PFC RECTIFIER WITH FLYING CAPACITORS

(71) Applicant: Delta Electronics, Inc., Taipei (TW)

(72) Inventors: Laszlo Huber, Durham, NC (US); Peter Mantovanelli Barbosa, Durham, NC (US)

(73) Assignee: Delta Electronics, Inc., Taipei (TW)

( * ) Notice: Subject to any disclaimer, the term of this patent is extended or adjusted under 35 U.S.C. 154(b) by 350 days.

(21) Appl. No.: 18/518,080

(22) Filed: Nov. 22, 2023

(65) Prior Publication Data

US 2025/0167671 A1 May 22, 2025

(51) Int. Cl.
*H02M 1/42* (2007.01)
*H02M 1/00* (2006.01)
*H02M 1/14* (2006.01)

(52) U.S. Cl.
CPC ....... *H02M 1/4225* (2013.01); *H02M 1/0043* (2021.05); *H02M 1/0095* (2021.05); *H02M 1/14* (2013.01)

(58) Field of Classification Search
CPC ............. H02M 1/4225; H02M 1/0043; H02M 1/0095; H02M 1/14
See application file for complete search history.

(56) References Cited

U.S. PATENT DOCUMENTS 9,130,458 B2 9/2015 Crookes et al.
2005/0127853 A1 6/2005 Su
2014/0119070 A1* 5/2014 Jeong ...................... H02M 1/42 363/45
2021/0376754 A1 12/2021 Jang et al.
2022/0060183 A1 2/2022 Yao et al.
2023/0268844 A1 8/2023 Menzi et al.
(Continued)

FOREIGN PATENT DOCUMENTS

CN 108599547 A 9/2018
CN 113300613 A 8/2021
EP 2887524 B1 6/2015
(Continued)

OTHER PUBLICATIONS

Yungtaek Jang et al., "The TAIPEI Rectifier A New Three-Phase Two-Switch ZVS PFC DCM Boost Rectifier", IEEE Transactions on Power Electronics, Institute of Electrical and Electronics Engineers, USA, vol. 28, No. 2, Feb. 1, 2013, pp. 686-694 .
(Continued)

*Primary Examiner* — Adolf D Berhane
(74) *Attorney, Agent, or Firm* — KIRTON McCONKIE; Evan R. Witt

(57) ABSTRACT

In one embodiment, a method to reduce inductor current ripple in a three-phase, flying capacitor multi-level boost power factor correction rectifier circuit having three totem-pole legs, the method including: determining, for the three-phase, flying capacitor multi-level boost power factor correction rectifier circuit, for which of at least one of a segment in a line cycle or a voltage level of a phase-to-neutral voltage, and for which totem-pole leg selected from any one of the three totem-pole legs, to apply an additional phase shift at one or more instances of time in the line cycle; and applying the additional phase shift in such a way as to center align midpoint voltages of the three totem-pole legs.

18 Claims, 25 Drawing Sheets

(56) References Cited

U.S. PATENT DOCUMENTS

2023/0396155 A1* 12/2023 Mallik ................ H02M 1/4216
2025/0125719 A1* 4/2025 Huber ................ H02M 1/4225

FOREIGN PATENT DOCUMENTS

TW 201312925 A 3/2013
TW 201347375 A 11/2013

OTHER PUBLICATIONS

Yong-Long Syu et al., "Phase-Shifted PWM with Dynamic Phase Shift Control and Zero Sequence Injection to Minimize Inductor Current Ripple in Three-Phase Flying Capacitor Multilevel Converters," 2020 IEEE 21st Workshop on Control and Modeling for Power Electronics (COMPEL), Aalborg, Denmark, 2020, pp. 1-7.
Yong-Long Syu et al., "Design and Control of A High Power Density Three-Phase Flying Capacitor Multilevel Power Factor Correction Rectifier," 2021 IEEE Applied Power Electronics Conference and Exposition (APEC), Phoenix, AZ, USA, 2021, pp. 613-618.

* cited by examiner

| Segment | Comparators | | | Decoder |
|---|---|---|---|---|
| | $V_{an}$ | $V_{bn}$ | $V_{cn}$ | |
| I | 1 | 0 | 0 | 4 |
| II | 1 | 1 | 0 | 6 |
| III | 0 | 1 | 0 | 2 |
| IV | 0 | 1 | 1 | 3 |
| V | 0 | 0 | 1 | 1 |
| VI | 1 | 0 | 1 | 5 |

THREE-PHASE MULTI-LEVEL BOOST PFC RECTIFIER WITH FLYING CAPACITORS

FIELD OF THE INVENTION

This invention relates to three-phase power factor correction (PFC) rectifiers, and more particularly to three-phase multi-level boost PFC rectifiers with flying capacitors.

BACKGROUND OF THE INVENTION

Three-phase PFC rectifiers at multi-kW levels are widely used in applications such as electric vehicle charging and data center power delivery. In such applications, the PFC rectifiers should achieve both high power density and high conversion efficiency. A flying capacitor multi-level (FCML) rectifier has great potential to improve the performance of three-phase PFC rectifiers due, for instance, to the smaller required PFC inductance, lower voltage rated switches, and the use of high-energy-density ceramic capacitors. In a single-phase N-level boost PFC rectifier (where N is an integer number greater than or equal to three) with flying capacitors and phase-shifted pulse-width modulation (PWM), the ripple frequency of the PFC inductor current is significantly increased and it is (N−1) times the switching frequency. The increase in ripple frequency results in a significantly reduced volume of the PFC inductor and electromagnetic interference (EMI) filter, and, consequently, increased power density. In addition, voltage stress of the totem-pole switches is significantly reduced (e.g., the voltage stress may be (N−1) times lower than the output voltage). Therefore, lower voltage rated switches with significantly reduced parasitic capacitances can be used, resulting in increased efficiency. In a three-phase multi-level boost PFC rectifier with flying capacitors, the ripple frequency of the PFC inductors' current can be further increased compared to the ripple frequency in a corresponding single-phase multi-level boost PFC rectifier. Explaining further, in a conventional 2-level three-phase six-switch boost PFC rectifier with continuous PWM, where the midpoint voltages of the three phase legs are center aligned, the ripple frequency of the current of the PFC inductors is twice the switching frequency. Therefore, one would expect that, if in the three-phase PFC rectifiers, the 2-level totem-pole legs are replaced with N-level totem-pole legs with flying capacitors, and phase-shifted PWM is applied, the ripple frequency of the current of the PFC inductors in the three-phase N-level boost PFC rectifier with flying capacitors is doubled compared to the ripple frequency of the PFC inductor current in the corresponding single-phase N-level boost PFC rectifier with flying capacitors (i.e., the ripple frequency of the current of the PFC inductors in the three-phase N-level boost PFC rectifier with flying capacitors increases to 2(N−1) times of the switching frequency). The doubling of the ripple frequency for a three-phase N-level boost PFC rectifier, when compared to a single-phase N-level boost PFC rectifier, results in further reduced volume of the PFC inductors and EMI filter. However, by observing the midpoint voltages of the three totem-pole legs, it can be seen that the midpoint voltages of the three totem-pole legs are not center aligned in some segments of a line cycle or in the whole line cycle. In fact, the midpoint voltages of only two totem-pole legs are center aligned. Consequently, in those segments of a line cycle, the ripple frequency of the current of the three-phase PFC inductors is not twice the ripple frequency of the corresponding single-phase PFC inductor current. Accordingly, it is desired to provide a method that combines the benefits of single-phase N-level, and three-phase 2-level, boost PFC rectifiers.

SUMMARY OF THE INVENTION

In one embodiment, a method to reduce inductor current ripple in a three-phase, flying capacitor multi-level boost power factor correction rectifier circuit having three totem-pole legs, the method including: determining, for the three-phase, flying capacitor multi-level boost power factor correction rectifier circuit, for which of at least one of a segment in a line cycle or a voltage level of a phase-to-neutral voltage, and for which totem-pole leg selected from any one of the three totem-pole legs, to apply an additional phase shift at one or more instances of time in the line cycle; and applying the additional phase shift in such a way as to center align midpoint voltages of the three totem-pole legs.

These and other aspects of the invention will be apparent from and explained with reference to the embodiment(s) described hereinafter.

BRIEF DESCRIPTION OF THE DRAWINGS

Many aspects of the invention can be better understood with reference to the following drawings, which are diagrammatic. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF EMBODIMENTS

Figure 1:
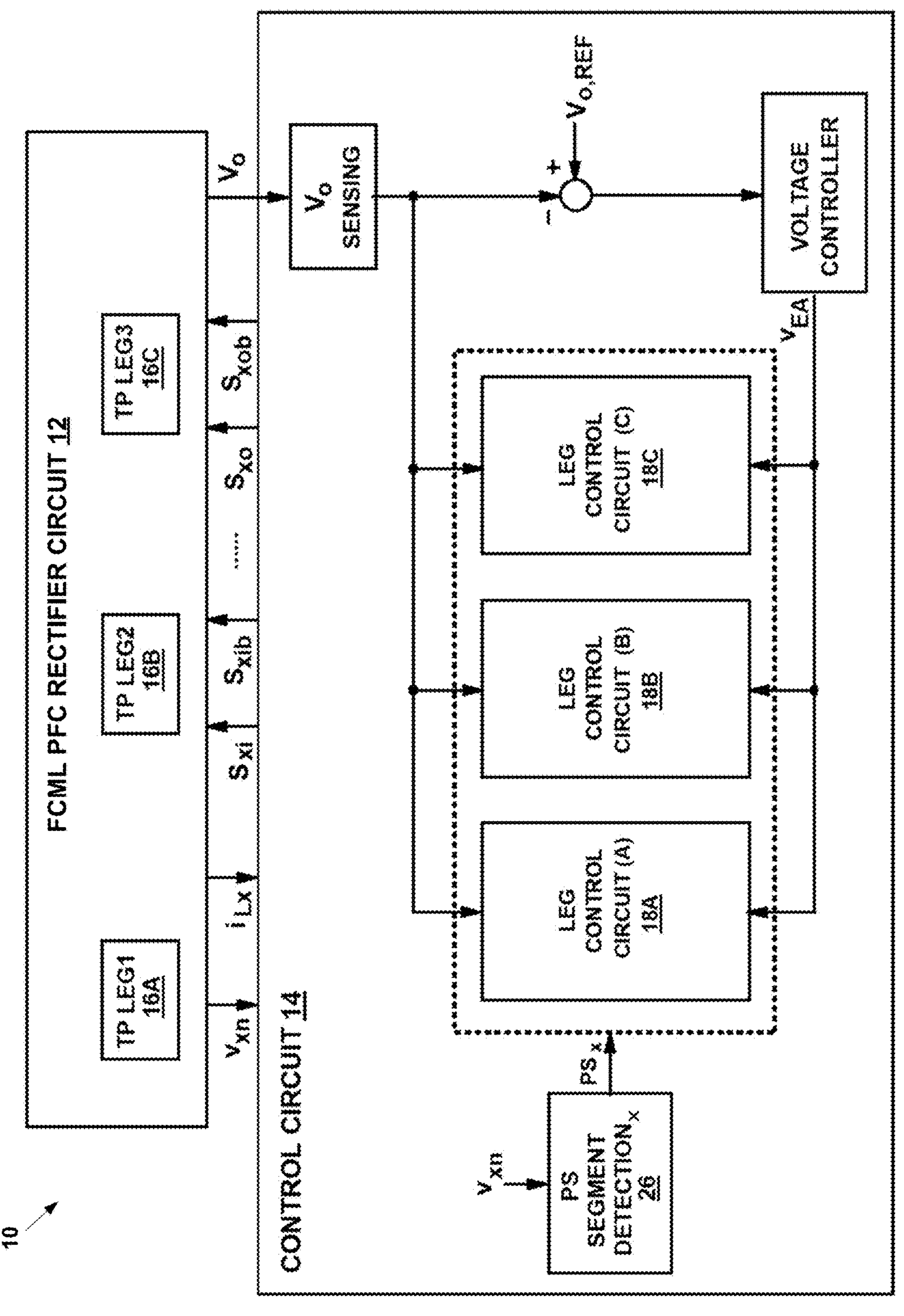
FIG. 1 shows a block diagram of an embodiment of an example 3-phase, flying capacitor N-level boost PFC rectifier.

Certain embodiments of a three-phase, flying capacitor multi-level (FCML) boost power factor correction (PFC) rectifier and method are disclosed. One embodiment of a method is disclosed that determines for at least one of which segments or voltage level and for which leg of a line cycle a three-phase FCML boost PFC totem-pole leg should be controlled with additional phase shift of gate pulses of the corresponding totem-pole switches to achieve midpoint voltages of all three totem-pole legs that are center aligned. Through center-alignment of the midpoint voltages of the three totem-pole legs, the ripple frequency of the PFC inductors' currents is twice the ripple frequency of the corresponding single-phase PFC inductor current, resulting also in a reduction in inductor current ripple.

Digressing briefly, in conventional 2-level three-phase six-switch boost PFC rectifiers with continuous PWM, the midpoint voltages of the three totem-pole legs are center aligned, resulting in a doubled ripple frequency of the PFC inductors' currents relative to the switching frequency and, consequently, significantly reduced volume of the PFC inductors and the EMI filter. To achieve doubling of the ripple frequency of the current of the PFC inductors in a three-phase FCML boost PFC rectifier, compared to the ripple frequency of the PFC inductor current in a corresponding single-phase FCML boost PFC rectifier, certain embodiments of a three-phase FCML boost PFC rectifier device (also simply referred to herein as a three-phase FCML boost PFC rectifier or PFC rectifier device) and method implement additional phase shifting of the gate pulses of the switches in the totem-pole leg whose midpoint voltage is not center aligned with the midpoint voltages of the other two totem-pole legs in such a way that the midpoint voltages of all three totem-pole legs are center aligned. Consequently, the ripple frequency of the current of the three-phase PFC inductors is (e.g., always) twice the ripple frequency of the corresponding single-phase PFC inductor current. In addition, the peak-to-peak value of the three-phase PFC inductors current ripple is significantly decreased compared to the peak-to-peak value of the corresponding single-phase PFC inductor current ripple.

Having summarized certain features of a 3-phase, FCML boost PFC rectifier of the present disclosure, reference will now be made in detail to the description of a 3-phase, FCML boost PFC rectifier as illustrated in the drawings. While a 3-phase, FCML boost PFC rectifier will be described in connection with these drawings, with emphasis on three, four, and five-level configurations, there is no intent to limit it to the embodiment or embodiments disclosed herein. For instance, the embodiments described herein may likewise be applied to multi-level (also, N-level, where N is greater than or equal to three) configurations for values of N other than three, four, or five, and hence are contemplated to be within the scope of the disclosure. It is noted that PFC rectifiers are sometimes referred to in the industry as PFC convertors. Further, although the description identifies or describes specifics of one or more embodiments, such specifics are not necessarily part of every embodiment, nor are all of any various stated advantages necessarily associated with a single embodiment. On the contrary, the intent is to cover alternatives, modifications and equivalents included within the principles and scope of the disclosure as defined by the appended claims. For instance, two or more embodiments may be interchanged or combined in any combination. Further, it should be appreciated in the context of the present disclosure that the claims are not necessarily limited to the particular embodiments set out in the description.

Figure 2:
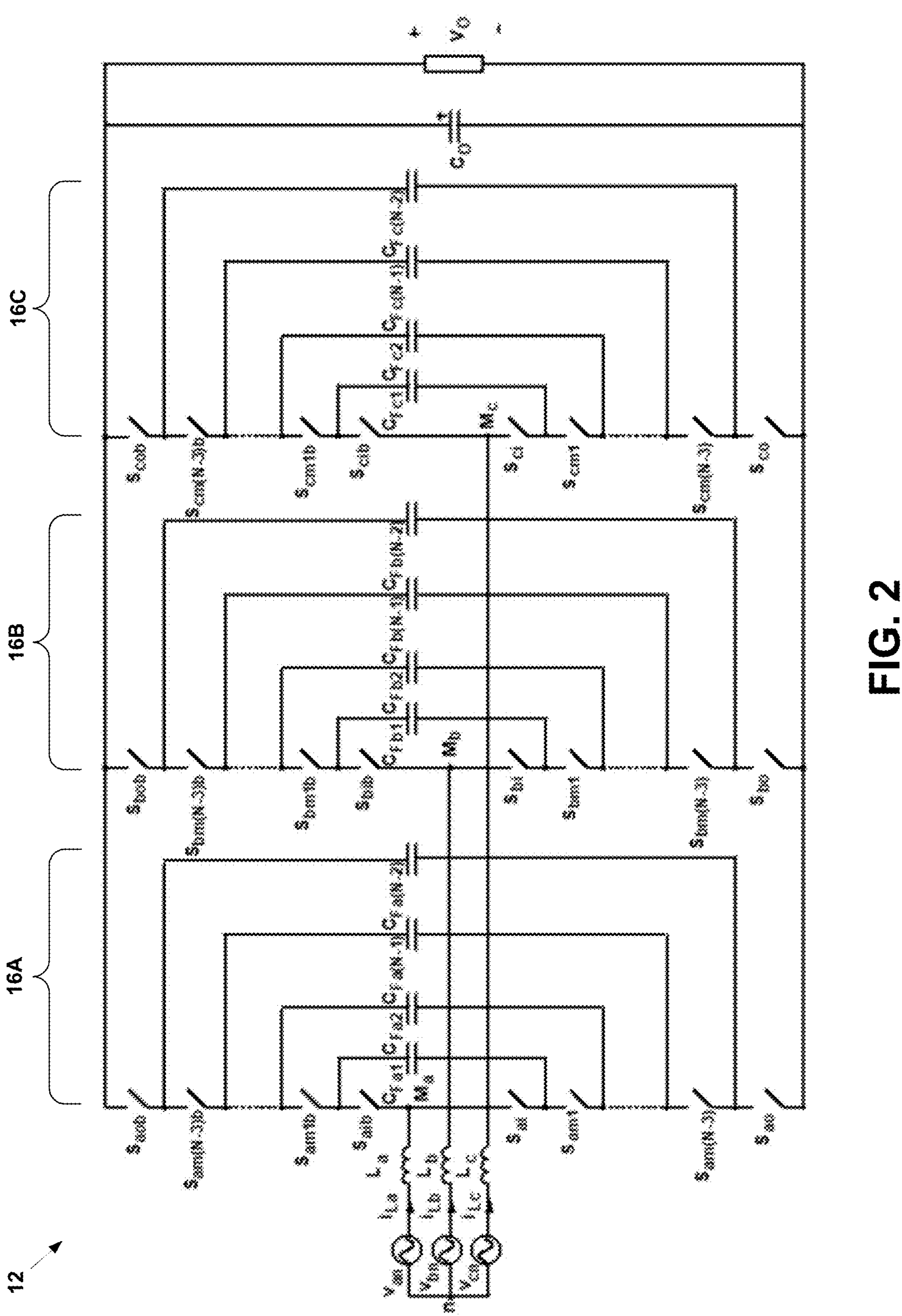
FIG. 2 shows a schematic diagram of an example 3-phase N-level boost PFC rectifier with flying capacitors for the rectifier shown in FIG. 1.

Referring now to FIG. 1, shown is an embodiment of an example 3-phase, flying capacitor multi-level (FCML) boost PFC rectifier 10. Note that reference to multi-level, or equivalently, N-level, refers to levels of three or greater. In the depicted embodiment, the 3-phase, FCML boost PFC rectifier 10 includes a FCML (boost) PFC rectifier circuit 12 coupled to a control circuit 14. The FCML PFC rectifier circuit 12 comprises three totem-pole (TP) legs 16 (e.g., 16A, 16B, and 16C) having a respective arrangement of totem-pole switches. For instance, and referring also to FIG. 2, shown is the FCML PFC rectifier circuit 12. The FCML PFC rectifier circuit 12 includes the three input phase voltages $V_{an}$, $V_{bn}$, and $V_{cn}$ coupled to respective inductors $L_a$, $L_b$, and $L_c$. Associated with the inductors $L_a$, $L_b$, and $L_c$ are inductor currents $i_{La}$, $i_{Lb}$, and $i_{Lc}$, respectively. Totem-pole leg1 16A is associated with input phase voltage, $V_{an}$, where midpoint node $M_a$ is connected between inductor $L_a$ and upper switch $S_{aib}$ and lower switch $S_{ai}$ of totem-pole leg1 16A. During operations, the midpoint node $M_a$ corresponds to the midpoint voltage for totem-pole leg1 16A. Totem-pole leg2 16B is associated with input phase voltage, $V_{bn}$, where midpoint node $M_b$ is connected between inductor $L_b$ and upper switch $S_{bib}$ and lower switch $S_{bi}$ of totem-pole leg2 16B. During operations, the midpoint node $M_b$ corresponds to the midpoint voltage for totem-pole leg2 16B. Totem-pole leg3 16C is associated with input phase voltage, $V_{cn}$, where midpoint node $M_c$ is connected between inductor $L_c$ and upper switch $S_{cib}$ and lower switch $S_{ci}$ of totem-pole leg 16C. During operations, the midpoint node $M_c$ corresponds to the midpoint voltage for totem-pole leg3 16C. In general, each of totem-pole legs 16 includes totem-pole switches. For instance, each of totem-pole legs 16 includes at least two pairs (e.g., for 3-level) of switches, each pair including an upper switch and a lower switch relative to the associated midpoint node. For instance, referring to leg1 16A, a first pair of switches includes upper switch $S_{aib}$ and lower switch $S_{ai}$, which operate in complementary manner (e.g., switching between roles as a boost switch and synchronous rectifier switch based on the duty cycle). Similarly, a second pair of switches includes upper switch $S_{am1b}$ and lower switch $S_{am1}$, also acting in complementary manner. Coupled to the first pair of switches $S_{aib}$, $S_{ai}$ is a flying capacitor $C_{Fa1}$. Similarly, coupled to the second pair of switches $S_{am1b}$, $S_{am1}$ is a flying capacitor $C_{Fa2}$. A similar arrangement is implemented for pairs of switches for the other legs 16B, 16C, and for any additional switches per leg (e.g., for more levels). In general, $S_{xi}$ and $S_{xib}$ are the inner switches, $S_{xo}$ and $S_{xob}$ are the outer switches, $S_{xmk}$ and $S_{xmkb}$, k=1, . . . ,(N−3), are the middle (between inner and outer) switches, $C_{Fx1}$-$C_{Fx(N-2)}$ are the flying capacitors, and $M_x$ is the midpoint in a totem-pole leg, x∈{a, b, c}.

It should be appreciated that the transistor types suggested by the switches depicted in FIG. 2 are not limited to a certain circuit topology. For instance, transistors may include MOSFETs (e.g., SiC MOSFETS), GaN, among others, and are contemplated to be within the scope of the disclosed embodiments of the invention.

Figure 3:
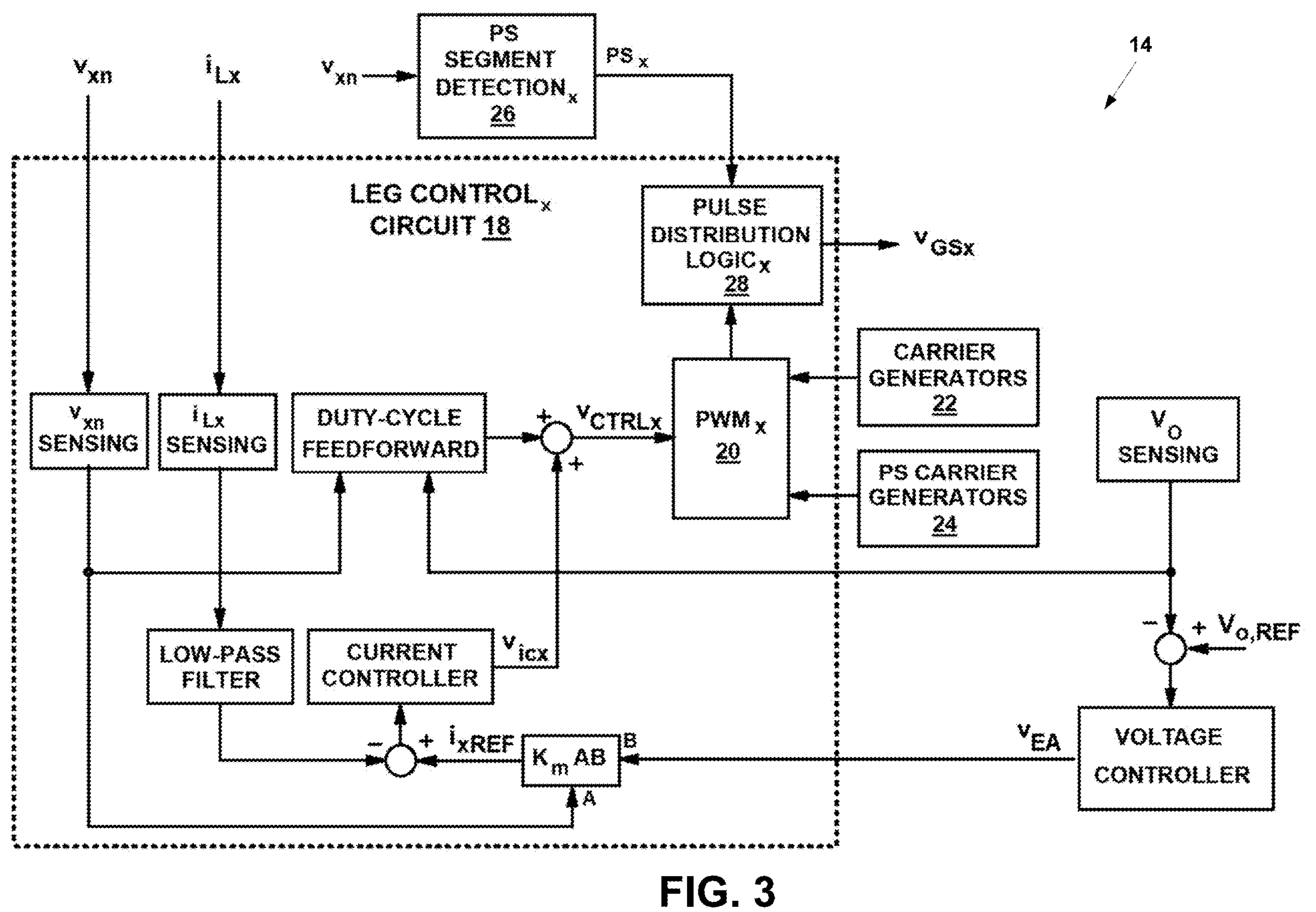
FIG. 3 shows a block diagram of an embodiment of an example control circuit with average current control of the 3-phase N-level boost PFC rectifier with flying capacitors shown in FIG. 1.

Referring again to FIG. 1, the control circuit 14 provides pulse-width modulated control of the switches of the totem-pole legs 16 through the use of leg control circuit 18A (e.g., for $phase_a$), leg control circuit 18B (e.g., for $phase_b$), and leg control circuit 18C (e.g., for $phase_c$) in conjunction with phase shift (PS) segment $detection_x$ block 26 (the dashed box encompassing the three leg control circuits 18 representing that input $PS_x$ may be provided to any of the three leg control circuits 18). Note that the segment $detection_x$ block 26 also, or alternatively, includes a voltage level determination/detection functionality as described below in association with FIGS. 10-17B for 4L and 5L and beyond). Leg control circuits 18A, 18B, and 18C are arranged structurally the same (e.g., replicated). In one embodiment, the control circuit 14 is configured to operate according to average current-mode control and duty-cycle feedforward control, as shown in FIG. 3. FIG. 3 shows the control circuit 14 with leg $control_x$ circuit 18 and PS segment $detection_x$ block 26. Leg control circuit 18 represents any of leg control circuit 18A, leg control circuit 18B, or leg control circuit 18C. In other words, the control circuit 14 includes three leg control circuits 18 (e.g., 18A, 18B, and 18C, as shown in FIG. 1), each with the same structure as depicted by leg control circuit 18 in FIG. 3. In general, for average current-mode control, a current controller is used in a feedback control loop and the line current leads the line voltage. However, with the line current leading the voltage, non-unity power factor and zero-crossing distortion of the line current may result. The duty-cycle feedforward control attempts to address these shortcomings by further using an out-of-loop (outside the feedback control loop) determined duty-cycle value (e.g., based on a rectified line voltage and the output voltage of the boost PFC rectifier), otherwise referred to as a pre-calculated duty-cycle value. In effect, the duty-cycle feedforward control alleviates the feedback control loop of performing this task. The pre-calculated duty cycle value is combined with the current control loop value to provide a control signal, $V_{CNTRLx}$, to $PWM_x$ block 20. Of particular relevance for purposes of the present disclosure are $PWM_x$ block 20, a set of carrier generators including basic carrier generators 22 and additional or phase-shifted carrier generators 24 (e.g., phase shifted relative to the basic carriers), PS segment $detection_x$ block 26, and pulse $distribution_x$ block 28. Note that x is a value included in the set of phase a, b, or c. Also, it should be appreciated by one having ordinary skill in the art that the components/blocks depicted in FIGS. 1 and 3 may be arranged differently to provide a similar result.

Figure 4:
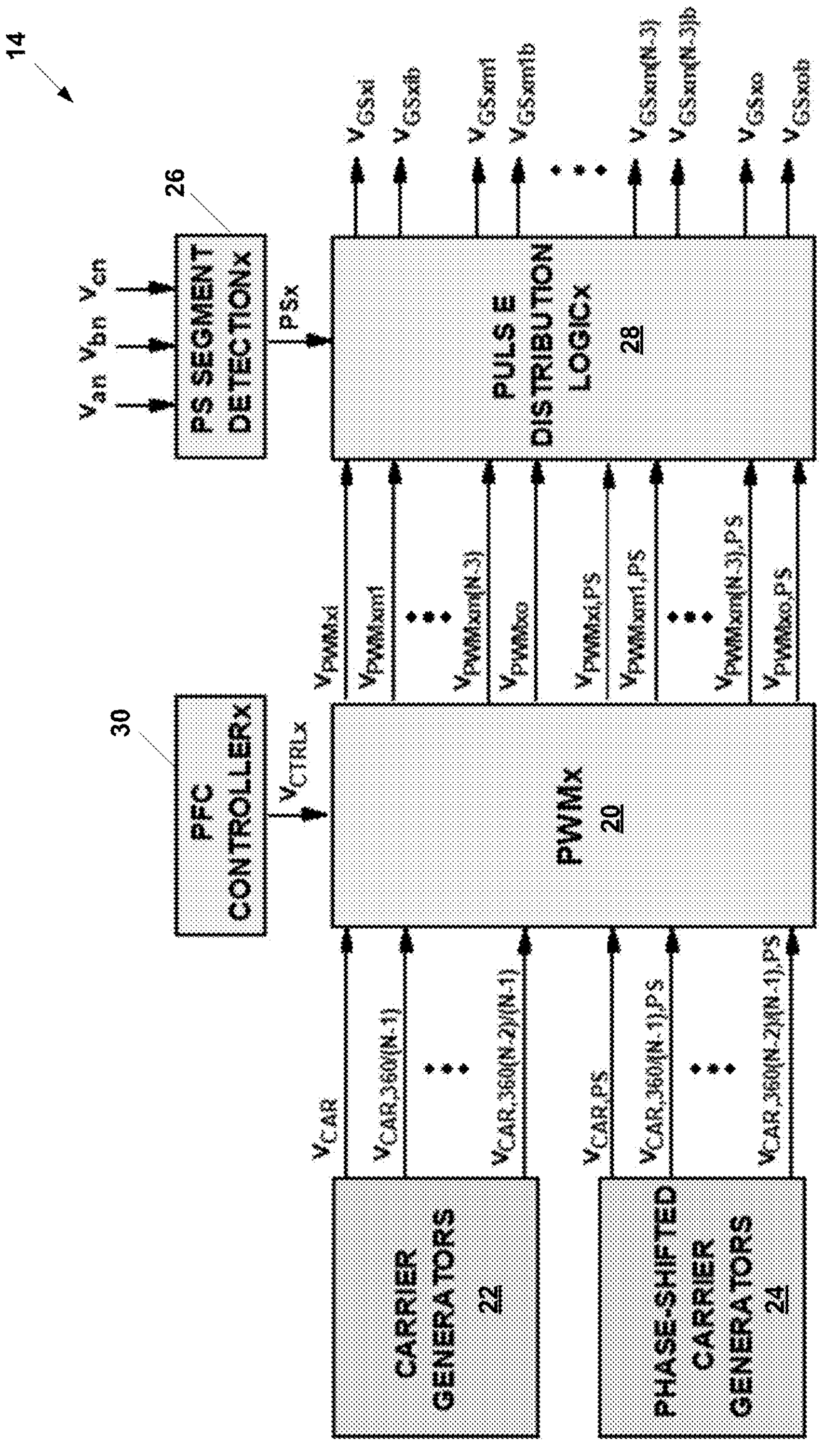
FIG. 4 shows a block diagram of an embodiment of select portions of the example control circuit of FIG. 3.

Referring now to FIG. 4, shown are select portions of the control circuit 14 for a multi-level, or N-level, FC boost PFC rectifier 10, where N is greater than or equal to 3. For instance, shown in FIG. 4 for select portions of the control circuit 14 are PFC $controller_x$ 30 (representing in abbreviated form the average current-mode and duty-cycle feedforward control circuitry from FIG. 3 that provides $V_{CNTRLx}$), $PWM_x$ block 20, basic carrier generators 22 and additional or phase-shifted carrier generators 24, and PS segment $detection_x$ block 26. Basic carrier generators 22 and PS carrier generators 24 provide, to the $PWM_x$ block 20, two sets of N−1 carriers: a basic set of N−1 carriers (from basic carrier generators 22) and an additional set of N−1 carriers (from PS carrier generators 24). The basic set of N−1 carriers contains $V_{CAR}$, $V_{CAR,360/(N-1)}$, . . . , $V_{CAR,360(N-2)/(N-1)}$, where two consecutive carriers are phase shifted by 360°/(N−1), i.e., $T_{SW}$/(N−1). For example, in the cases of FC 3-level and FC 4-level boost PFC rectifiers, the basic set of carriers contains 2 and 3 carriers, phase shifted by 180° and 120°, i.e., $T_{SW}/2$ and $T_{SW}/3$, respectively. The additional set of N−1 carriers contains $v_{CAR,PS}$, $v_{CAR,360/(N-1),PS}$, . . . , $v_{CAR,360(N-2)/(N-1),PS}$, where each additional carrier is phase shifted by 360°/[2(N−1)], i.e., $T_{SW}$/[2(N−1)], relative to the corresponding carrier in the basic set of carriers. For example, in cases of FC 3-level and FC 4-level boost PFC rectifiers, the additional carriers are phase shifted by 90° and 60°, i.e., $T_{SW}/4$ and $T_{SW}/6$, respectively, relative to the corresponding carriers in the basic set of carriers.

Figure 5:
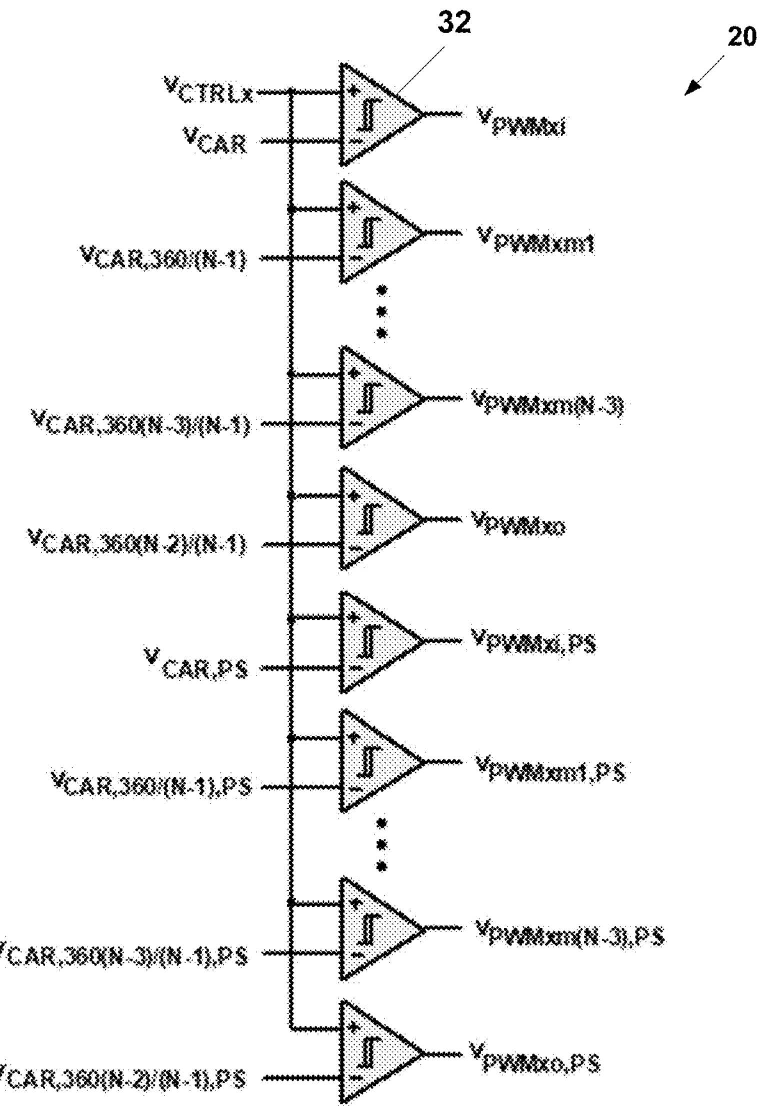
FIG. 5 shows a schematic diagram of an embodiment of an example circuit for the $PWM_x$ block of FIG. 4.

The $PWM_x$ block 20, where as indicated above x∈{a, b, c}, contains 2 sets of (N−1) comparators with hysteresis corresponding to the two sets of carriers. That is, for each carrier, there is a comparator with hysteresis. FIG. 5 shows an embodiment of an example circuit of the $PWM_x$ block 20. As shown in FIG. 5, the $PWM_x$ block 20 includes an arrangement of comparators 32, each with an input for $V_{CTRLx}$ and another input from either a carrier from the basic carrier generators 22 or a carrier from the PS carrier generators 24. The $V_{CTRLx}$ control signal output from PFC $controller_x$ 30 and input to the $PWM_x$ block 20 (e.g., at the input to each of the comparators 32) in FIGS. 4-5 is the sum of the output signal $v_{icx}$ of the current controller and the duty-cycle feedforward signal of the leg control circuit 18, as shown in FIG. 3. The comparators 32 convert the control signal, $V_{CTRLx}$, to pulses. In effect, the comparators 32 compare the carriers with the control signal, with the output of the comparators 32 including pulses based on the basic carrier set (e.g., $V_{PWMxi}$, $V_{PWMxm1}$, etc.) and pulses based on the PS carrier set (e.g., $V_{PWMxi,PS}$, $VP_{WMxm1,PS}$, etc.).

In the PS segment $detection_x$ block 26 in FIG. 4, the relevant three-phase FCML boost PFC rectifier totem-pole leg 16 (e.g., 16A, 16B, or 16C in FIG. 2) is detected whose switch gate pulses are additionally phase shifted in different segments of a line cycle, according to the present invention. The logic of the PS segment detection$_x$ block 26 is different for different number of levels N. The logic of the PS segment detection$_x$ block 26 is described below for the examples of three-phase FCML boost PFC rectifiers with 3, 4, and 5 levels.

The pulse distribution logic$_x$ block 28 in FIG. 4 distributes the PWM pulses at the output of the PWM$_x$ block 20 to the switches of the x totem-pole leg 16, x∈{a, b, c}, based on the output signal PS$_x$ of the PS segment detection$_x$ block 26. The gate pulses of the switches of the x totem-pole leg 16 are determined as follows:

$$v_{GSxy}=v_{PWMxy,PS}\cdot PS_x+v_{PWMxy}\cdot\overline{PS_x},\ y\in\{i,\ m1,\ \ldots\ ,m(N-3),o\}.$$

Figure 6:
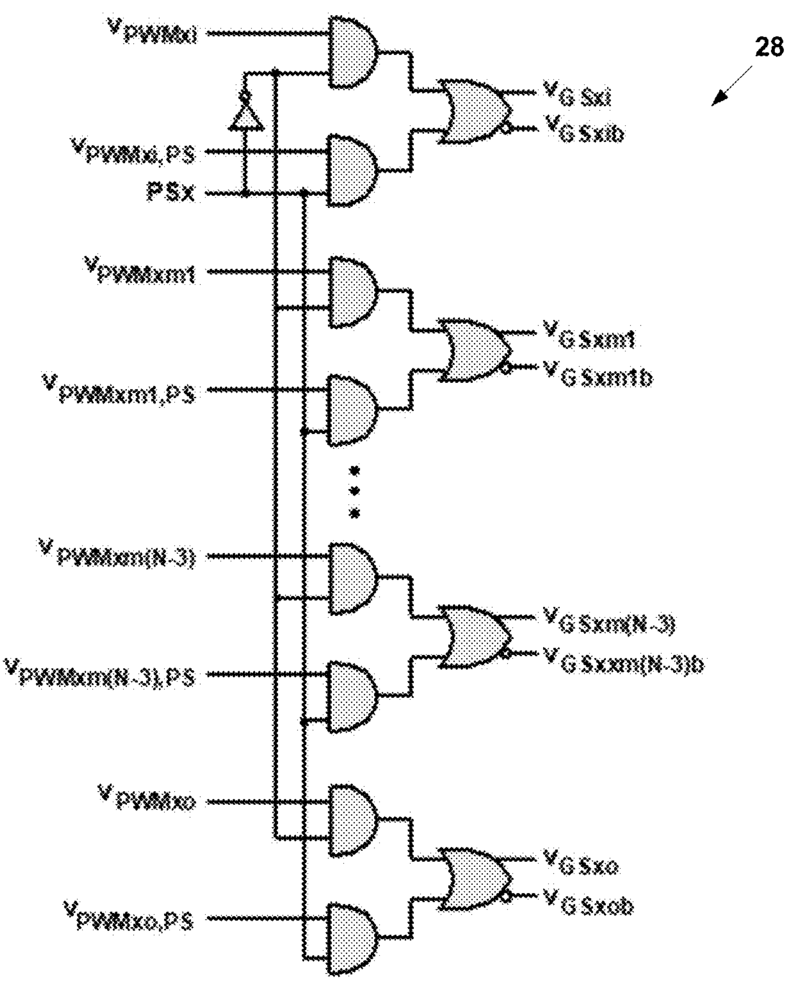
FIG. 6 shows a schematic diagram of an embodiment of an example circuit for the pulse distribution $logic_x$ block in FIG. 4.

Note that "m" denotes the middle switches, "i" denotes the inner switches, and "o" denotes the outer switches of the totem-pole legs 16. FIG. 6 shows an embodiment of an example circuit for the Pulse Distribution Logic$_x$ block 28. The pulse distribution logic$_x$ block circuit includes an arrangement of logic gates that selects either additional phase-shifted gate pulses (e.g., based on PS carrier generators 24) or non-shifted gate pulses (e.g., based on basic carrier generators 22) based on the value of PS$_x$ from the PS segment detection$_x$ block 26. In effect, the pulse distribution logic$_x$ block 28 implements the logic function of $V_{GSxy}$ reproduced above. If PS$_x$=1, $V_{GSxy}=V_{PWMxy,PS}$ (i.e., the phase-shifted pulse). If PS$_x$=0, $V_{GSxy}=V_{PWMxy}$ (i.e., the non phase-shifted pulse).

Figure 7A:
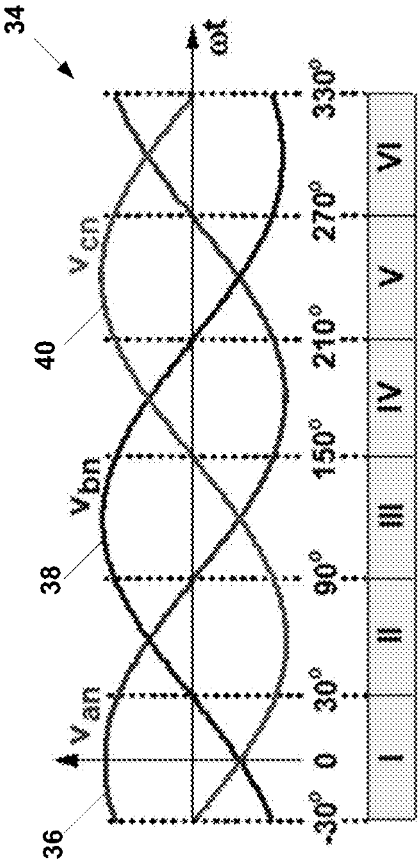
FIG. 7A shows a schematic diagram of a line cycle and a definition of sixty-degree segments.
Figures 7B, 7C:
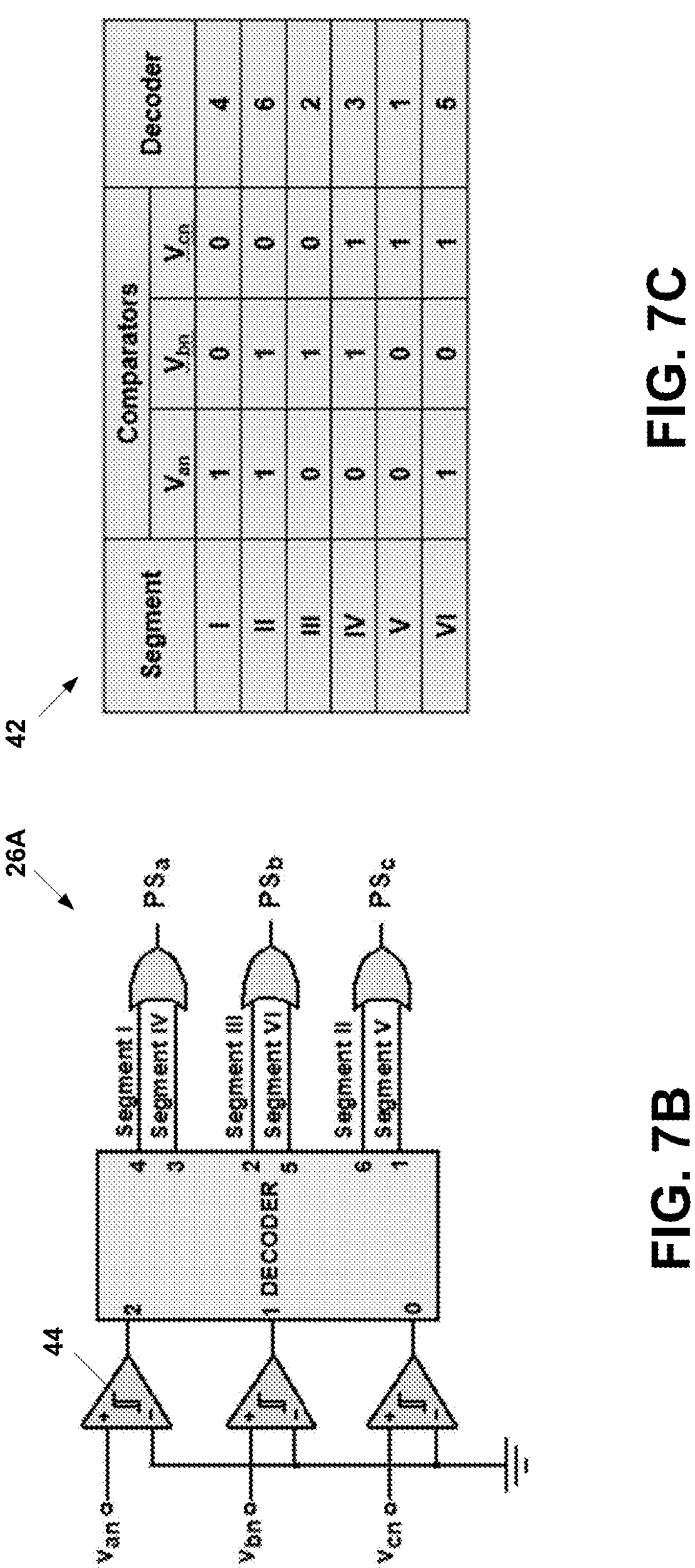
FIG. 7B shows a schematic diagram of an embodiment of an example circuit for the PS segment $detection_x$ block of FIG. 4.
FIG. 7C shows a schematic diagram of an example truth table used in the determination of the current sixty-degree segment, in accordance with one embodiment.

As explained above, the PS segment detection$_x$ block 26 differs in the manner in which it detects the part of a line cycle that additional phase-shifting is used to align the midpoint voltage pulses for different levels. Attention is directed now to FIGS. 7A-7C and segment identification and ultimately phase-shift control to ensure center alignment of the midpoint voltages for the case of a 3-phase 3-level boost PFC rectifier device with flying capacitors. In general, one embodiment of a method is described below where an additional phase shift of $T_{SW}/4$ is implemented in the totem-pole leg 16 associated with the input phase with the maximum absolute value of the phase-to-neutral voltage, according to one embodiment of the present invention. For the purpose of proper input phase detection, a line cycle 34 is divided into six 60° segments, so that in each 60° segment, one phase-to-neutral voltage has maximum absolute value, as shown in FIG. 7A. For instance, the line cycle 34 includes phase-to-neutral voltages $V_{an}$ 36, $V_{bn}$ 38, and $V_{cn}$ 40. The sixty-degree segments of the line cycle 34 are denoted with Roman numerals I-VI beneath the line cycle 34. Notably, each sixty-degree segment has one input phase-to-neutral voltage that is at an absolute maximum value, with the other phases shown in FIG. 7A in a criss-cross pattern. For instance, for segments I and IV, $V_{an}$ 36 is at an absolute maximum phase-to-neutral voltage, whereas the other input phase-to-neutral voltages $V_{bn}$ 38 and $V_{cn}$ 40 are not (shown in criss-cross pattern). FIG. 7B shows an embodiment of an example circuit for the PS segment detection$_x$ block 26A, and FIG. 7C shows a truth table 42 used in decoding the input phase-to-neutral voltages of the line cycle 34. Referring to FIG. 7B, the PS segment detection$_x$ block 26A comprises three comparators 44 with hysteresis. The inputs to the comparators 44 include the respective phase-to-neutral voltages $V_{xn}$ (e.g., $V_{an}$, $V_{bn}$, and $V_{cn}$) and ground (a zero reference). The comparators 44 are used to determine whether the received voltages are positive or negative. When the input value is positive, the output of the comparator 44 is 1, otherwise, the output value is zero. For instance, and referring also to FIG. 7A, in segment I, $V_{an}$ 36 is positive and $V_{bn}$ 38 and $V_{cn}$ 40 are negative. Accordingly, in the truth table 42, segment I shows values of 1, 0, and 0 for the outputs of the comparators 44 for $V_{an}$, $V_{bn}$, and $V_{cn}$, respectively. Similarly, in Segment IV, the input phase-to-neutral voltage $V_{an}$ 36 is negative, whereas $V_{bn}$ 38 and $V_{cn}$ 40 are positive. Accordingly, the truth table 42 for Segment IV includes values of 0, 1, and 1 for $V_{an}$, $V_{bn}$, and $V_{cn}$, respectively. The combination of binary values for each segment are used to determine the phase shift output PS$_a$. For instance, in Segment I, the combination of binary values 1, 0, and 0 correspond to decoder output 4 (1×2^2), and in Segment IV, the combination of binary values 0, 1, and 1 correspond to decoder output 3 (0×2^2+1×2^1+1×2^0). As shown the segments I and IV (decoder outputs 4 and 3, respectively) are used with logic to provide PS$_a$. The additional phase shift (PS) control signals are obtained as follows:

$$PS_a = \text{Segment } I + \text{Segment } IV$$

$$PS_b = \text{Segment } III + \text{Segment } VI$$

$$PS_c = \text{Segment } II + \text{Segment } V$$

In other words, when the current sample of the line cycle 34 is in Segments I or IV, an additional phase shift of PS$_a$ is performed on gate pulses delivered to the switches corresponding to the totem-pole leg for $V_{an}$ (e.g., totem-pole leg 16A, FIG. 2), but not to gate pulses destined to switches of the other totem-pole legs 16B, 16C for the other two phases. Similarly, when the current sample of the line cycle 34 is in Segments Ill or VI an additional phase shift of PS$_b$ is performed on gate pulses delivered to the switches corresponding to the totem-pole leg for $V_{bn}$ (e.g., totem-pole leg 16B, FIG. 2), and not to the gate pulses for the other totem-pole leg switches for $V_{an}$, $V_{cn}$. Also, when the current sample of the line cycle 34 is in Segments II or V an additional phase shift of PS$_c$ is performed on gate pulses delivered to the switches corresponding to the totem-pole leg for $V_{cn}$ (e.g., totem-pole leg 16C, FIG. 2), and not to the gate pulses for the other totem-pole leg switches for $V_{an}$, $V_{bn}$.

Figure 8A:
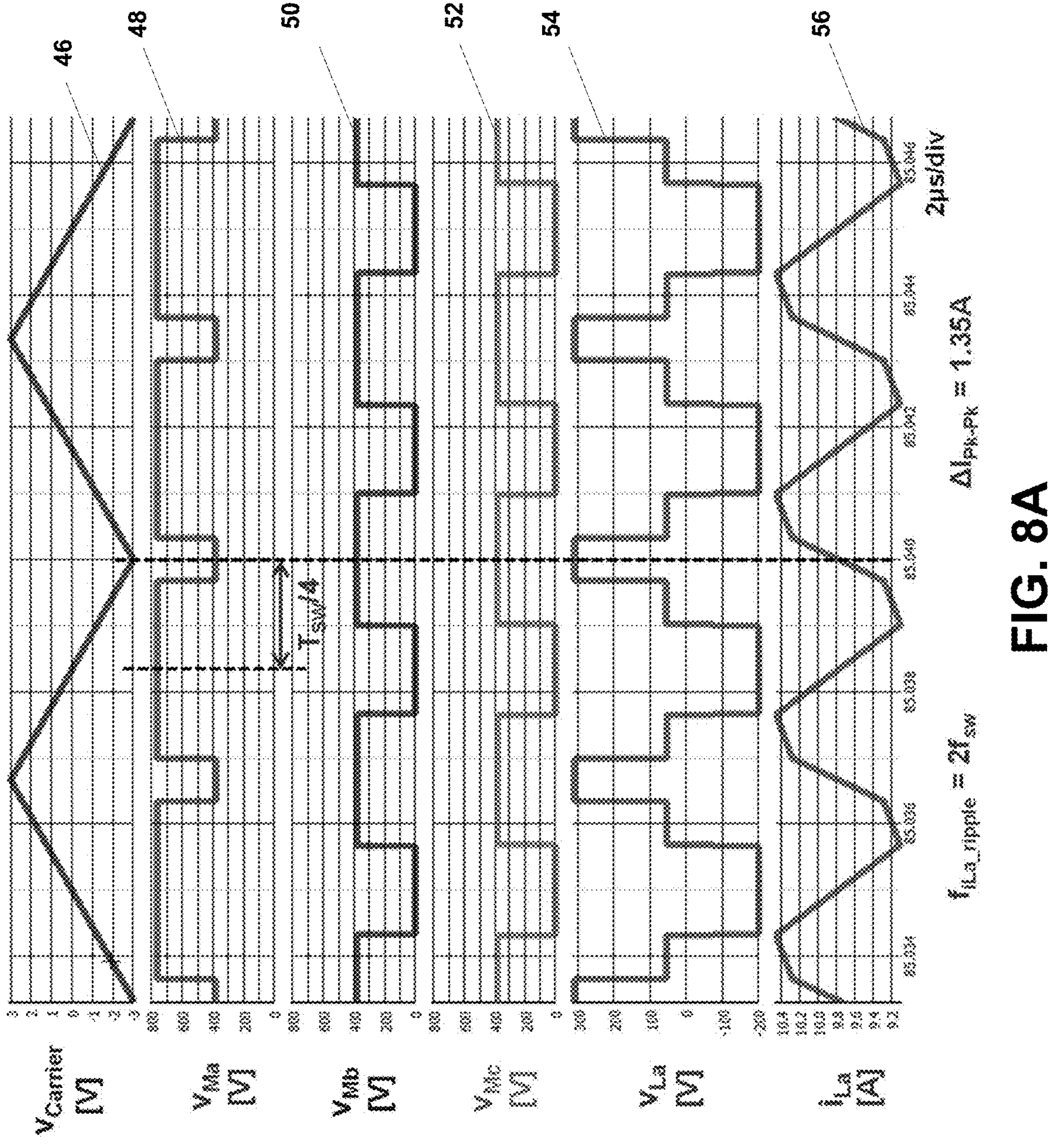
FIGS. 8A and 8B are simulated waveform diagrams showing an example operation of an example 3-phase FC 3-level boost PFC rectifier without additional phase shift control and with additional phase shift control, respectively, in accordance with one embodiment.
Figure 8B:
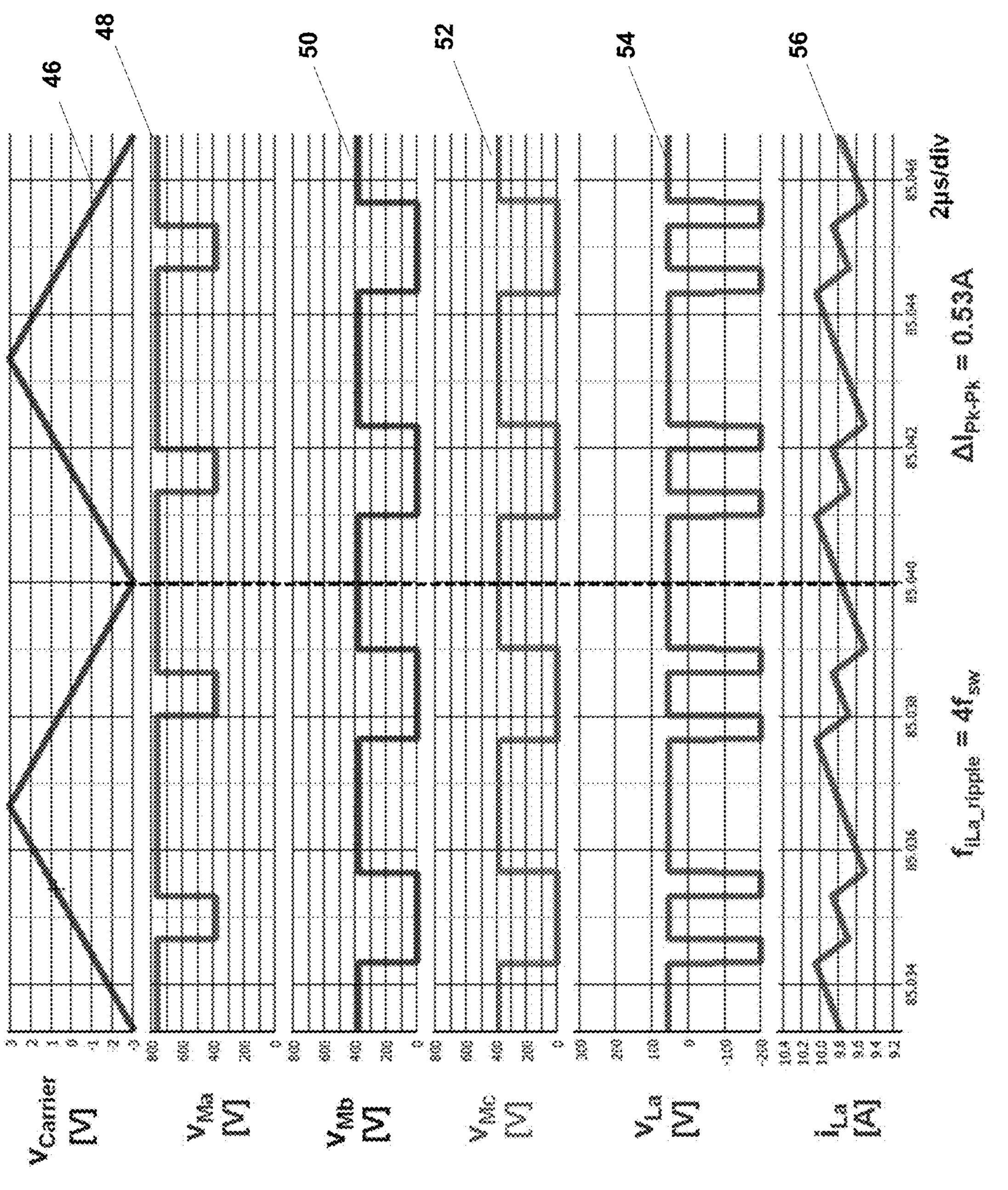

To illustrate the operation of the 3-phase FC 3-level boost PFC rectifier with additional phase-shift control, important simulation waveforms, obtained on a 4.5 kW 3-phase FC3L boost PFC rectifier, with inductors $L_{a,b,c}$=200 uH, with three independent average current mode controllers operating at 150 kHz switching frequency, at 3×220 Vrms, 50 Hz input voltage and 760V output voltage, are shown in FIGS. 8A, 8B and 9A, 9B. The waveforms in FIG. 8A illustrate the operation without additional phase shift control, whereas the waveforms in FIG. 8B illustrate the operation with additional phase shift control. The waveforms in FIGS. 8A-8B, from top to bottom, are the basic triangular carrier 46, midpoint voltages 48 ($M_a$), 50 ($M_b$), and 52 ($M_c$) of three totem-pole legs (e.g., corresponding legs 16A, 16B, and 16C in FIG. 2), "a" phase boost inductor voltage, $V_{La}$ 54, and "a" phase boost inductor current, $i_{La}$ 56, all zoomed-in in Segment I of a line cycle (e.g., line cycle 34, FIG. 7A) around the peak value of input phase voltage $v_{an}$, where as described above in association with FIGS. 7A-7C, the input phase-to-neutral voltage is at a maximum absolute value and targeted with a phase shift PS$_a$. It is shown in FIG. 8A that the midpoint voltage of totem-pole leg "a" (e.g., waveform 48) is not central aligned with the midpoint voltages of the other two totem-pole legs (e.g., waveforms 50, 52), but it is phase shifted by $T_{SW}/4$. In general, in a 3-phase multi-level boost PFC rectifier with flying capacitors, by observing the midpoint voltages of the three totem-pole legs, it can be seen that in some segments of a line cycle, or in the whole line cycle, the midpoint voltages of only two totem-pole legs are center aligned. It is also shown in FIG. 8A that the ripple frequency of the "a" phase PFC inductor current $i_{La}$ 56 is twice the switching frequency, i.e., $f_{ripple,iLa}=2f_{SW}$, which is the result of the 3-phase, 3-level boost PFC operation with flying capacitors. That is, flying capacitors enable the increase in ripple frequency by virtue of allowing for the repeating of the same inductor current within a single switching cycle (e.g., using at least two different sets of switches). Certain embodiments of a 3-phase FC 3-level boost PFC rectifier additionally phase shift the gate pulses of the switches in the totem-pole leg whose midpoint voltage is not center aligned with the midpoint voltages of the other two totem-pole legs. By implementing this additional phase shift in the segment at issue, the midpoint voltages of all three totem-pole legs are center aligned, resulting in desired doubling of the ripple frequency of the PFC inductors' currents. In the present example, by phase shifting the midpoint voltage of totem-pole leg "a" by $T_{SW}/4$, the midpoint voltages of all three totem-pole legs are central aligned, as shown by waveforms 48, 50, and 52 in FIG. 8B. The central-aligned midpoint voltages of all three totem-pole legs results in a doubled ripple frequency of the PFC inductor current $i_{La}$ 56 as shown in FIG. 8B, i.e., $f_{ripple,iLa}=4f_{SW}$, and in significantly decreased (~2.5×) peak-to-peak value (e.g., from approximately 1.35 A to 0.53 A) of the PFC inductor current ripple (e.g., also shown by waveform $i_{La}$ 56 in FIG. 8B, as compared to waveform 56 in FIG. 8A).

Figure 9A:
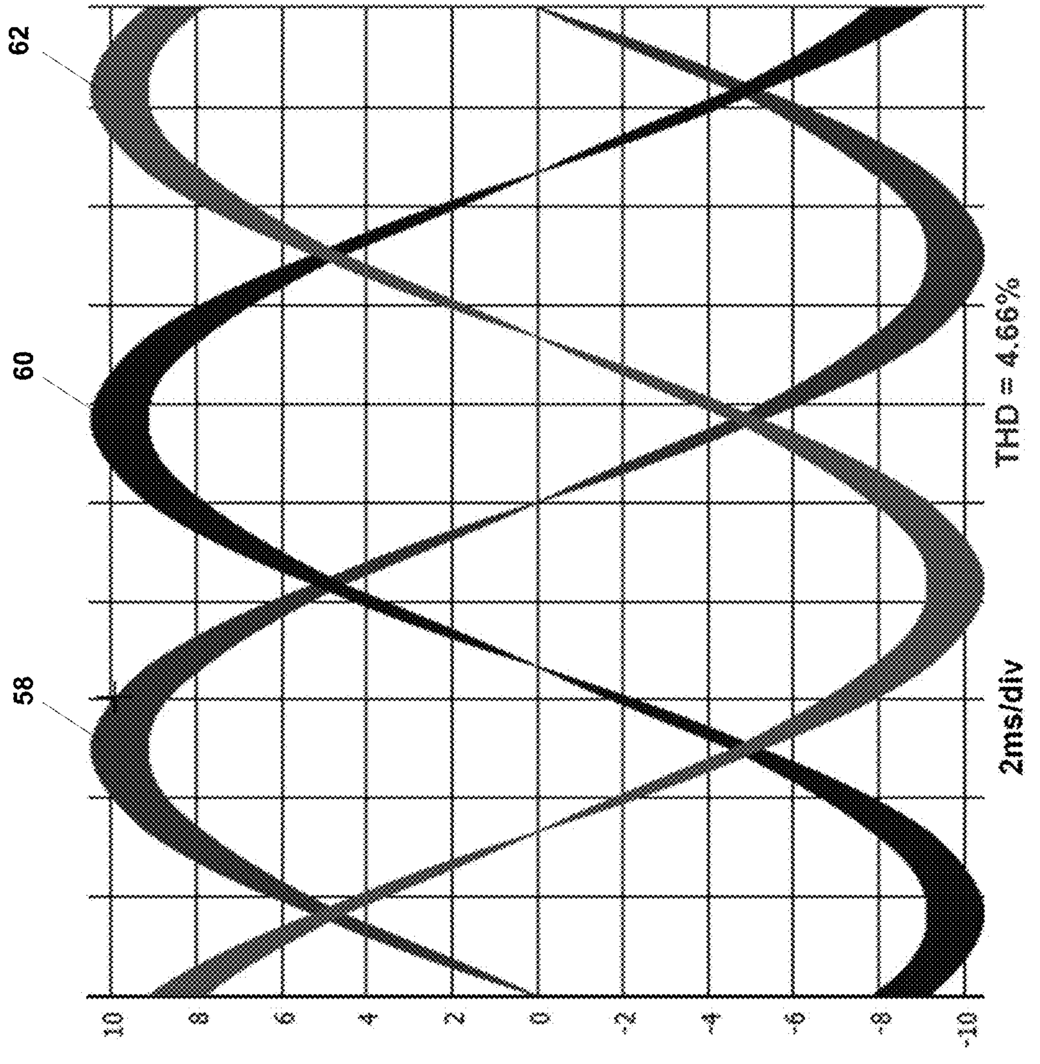
FIGS. 9A and 9B are simulated waveform diagrams corresponding to PFC inductors' currents of an example 3-phase FC 3-level boost PFC rectifier without additional phase shift control and with additional phase shift control, respectively, in accordance with one embodiment.
Figure 9B:
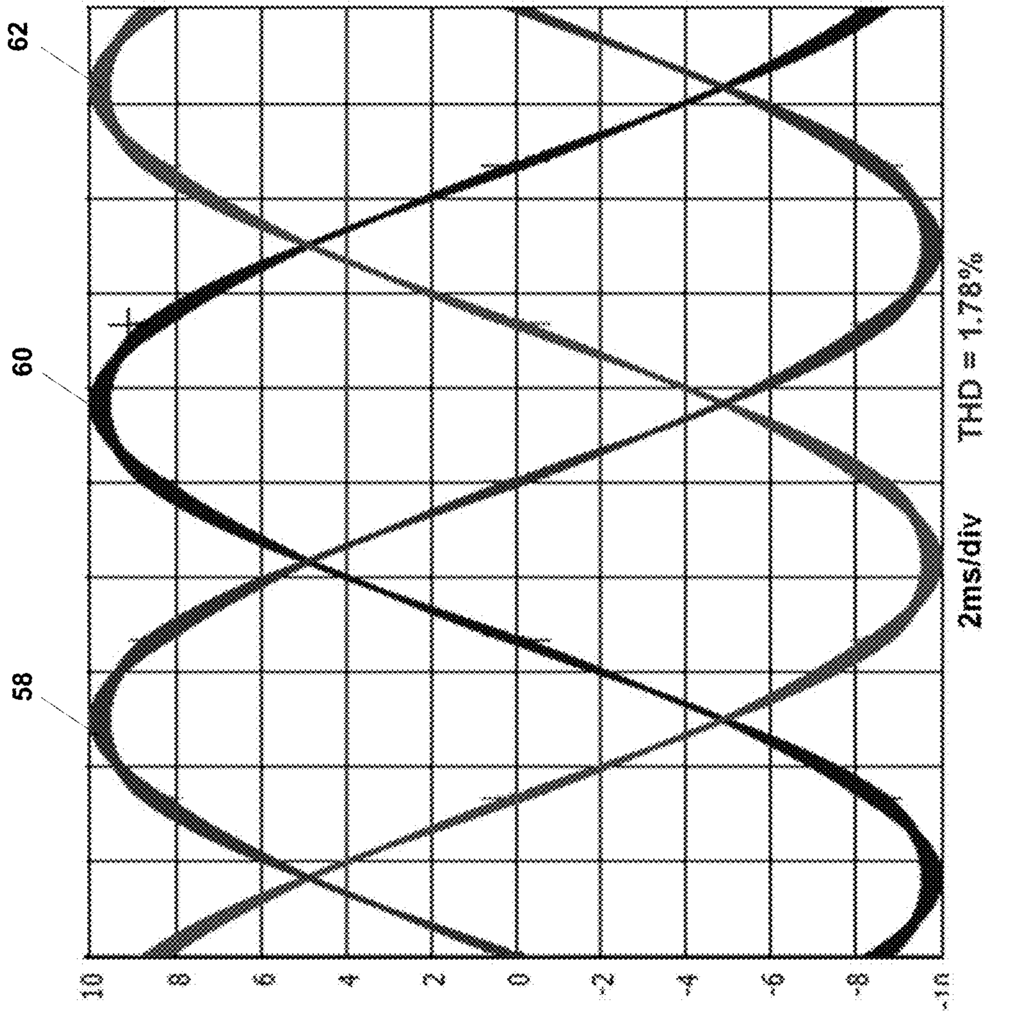

The waveforms of the currents of the PFC inductors of the 3-phase FC 3-level boost PFC within a line cycle are shown in FIGS. 9A and 9B without additional phase shift control (FIG. 9A) and with additional phase shift control (FIG. 9B). In FIGS. 9A-9B, shown are waveforms for $I_{La}$ 58, $i_{Lb}$ 60, and $i_{Lc}$ 62 (e.g., in units of Amperes (A)). It is shown in FIG. 9B that the ripple of the PFC inductors currents with additional phase shift control significantly decreases compared to that without additional phase shift control (FIG. 9A) in the whole line cycle, resulting in a significantly decreased total harmonic distortion (e.g., from THD of approximately 4.66% to 1.78%, or ~2.6×).

In case of 3-phase 4-level boost PFC rectifier with flying capacitors, according to another embodiment of the present invention, an additional phase shift of $T_{SW}/6$ is implemented in the totem-pole leg (e.g., totem-pole legs 16A, 16B, 16C) whose midpoint voltage level is between $V_o/3$ and $2V_o/3$. The proper input phase is detected by sensing the phase-to-neutral voltages, level shifted by $V_o/2$. Specifically, an additional phase shift of $T_{SW}/6$ is implemented in the totem-pole leg associated with the input phase whose phase-to-neutral voltage, level shifted by $V_o/2$, is between $V_o/3$ and $2V_o/3$.

Figure 10:
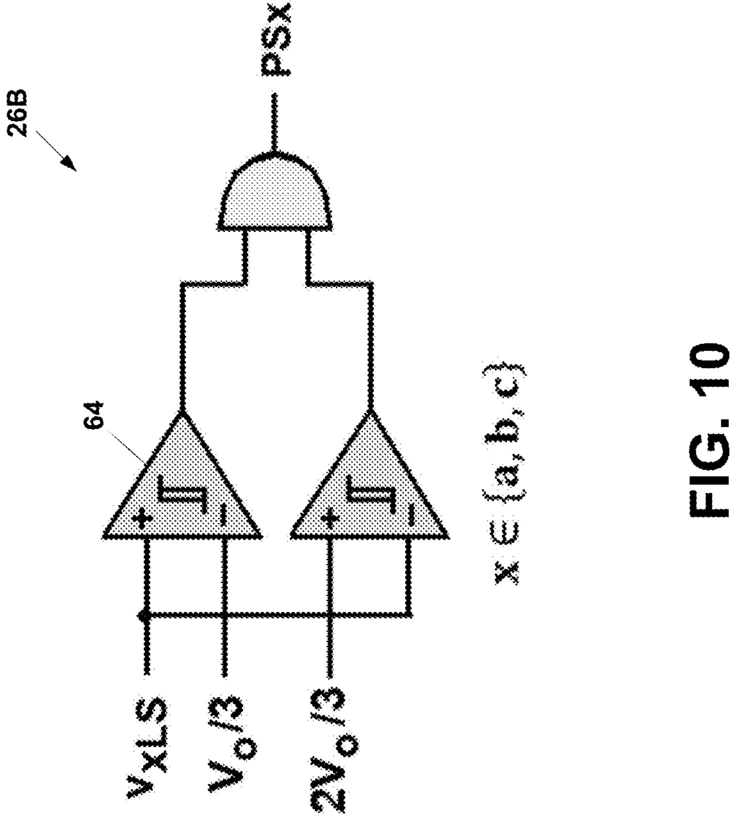
FIG. 10 shows a schematic diagram of an embodiment of an example circuit for the PS segment detection$_x$ block of FIG. 4 for a 3-phase 4-level boost PFC rectifier with flying capacitors.

FIG. 10 shows an embodiment of an example circuit of the PS segment detection$_x$ block 26 described in association with FIGS. 3-4, and shown in FIG. 10 for the specific case of a 3-phase 4-level boost PFC rectifier with flying capacitors and denoted with reference numeral 26B. The PS segment detection$_x$ block 26B comprises comparators with hysteresis 64 that determine whether the level-shifted voltage (level) for a particular phase is between $V_o/3$ and $2V_o/3$, and additional logic to implement the control $PS_x$ below and hence provide the additional phase shift $PS_x$ (e.g., to pulse distribution$_x$ block 28, FIG. 4). The additional phase shift (PS) control signals are obtained as follows:

$$PS_x = \left(\frac{V_o}{3} \le v_{xLS} \le \frac{2V_o}{3}\right),\ x \in \{a, b, c\}$$

where, $V_{xLS}$, X∈{a, b, c}, is the phase-to-neutral voltage $v_{xn}$ level shifted by $V_o/2$, i.e., $V_{xLS}=V_{xn}+V_o/2$.

Figure 11:
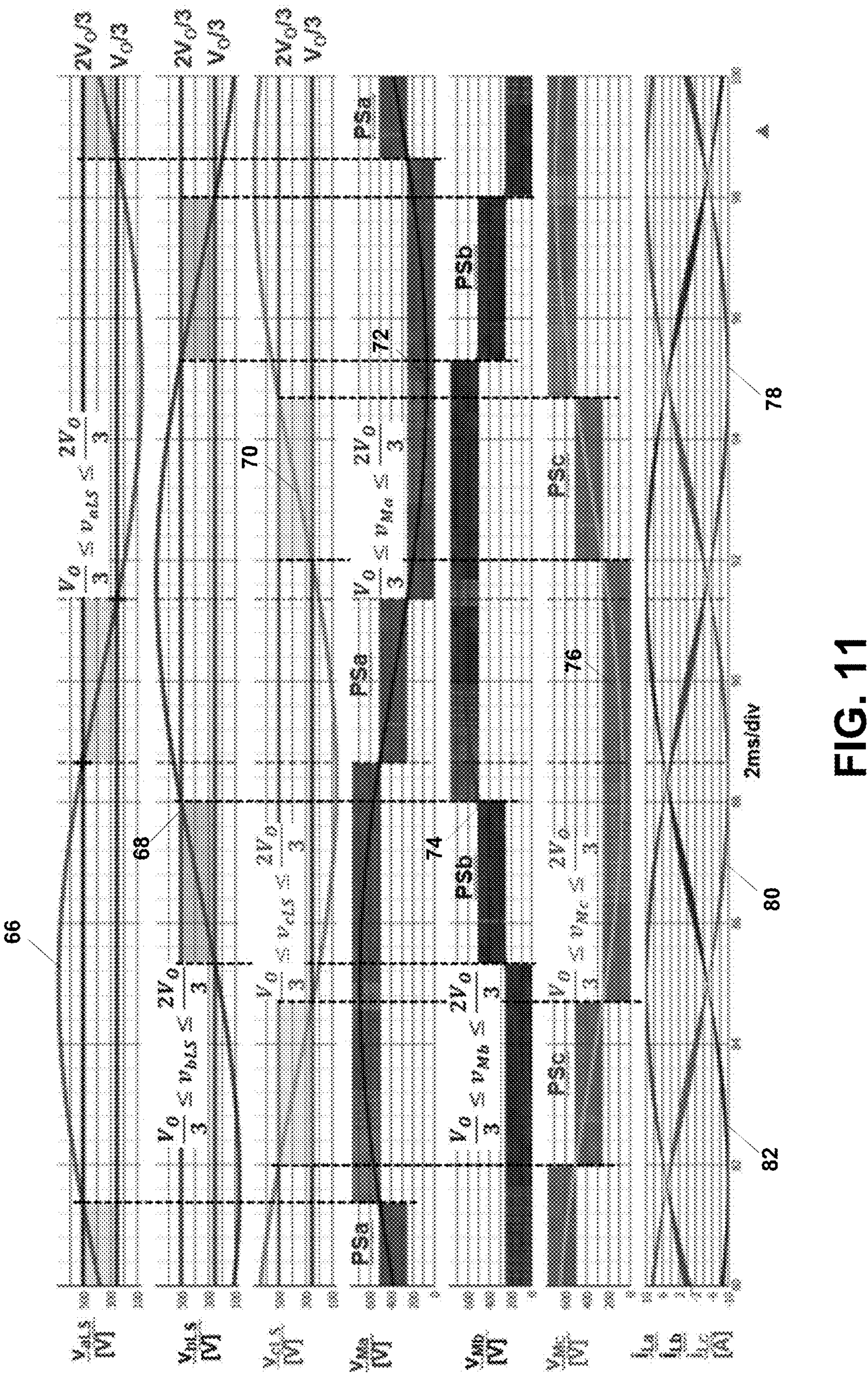
FIG. 11 shows simulated waveform diagrams showing an embodiment of an example input phase detection method for additional phase shift control by sensing the phase-to-neutral voltages, level shifted by $V_o/2$, in the 3-phase FC 4-level boost PFC rectifier.

To illustrate the operation of the 3-phase FC 4-level boost PFC rectifier with additional phase-shift control, important simulation waveforms, obtained on a 4.5 kW 3-phase FC4L boost PFC rectifier, with inductors $L_{a,b,c}$=100 uH, with three independent average current mode controllers operating at 150 kHz switching frequency, at 3×220 Vrms, 50 Hz input voltage and 760V output voltage, are shown in FIGS. 11-13. The waveforms in FIG. 11, from top to bottom, include $V_{aLS}$ 66, $V_{bLS}$ 68, and $V_{cLS}$ 70, which are the three phase-to-neutral voltages level shifted by $V_o/2$, $V_{Ma}$ 72, $V_{Mb}$ 74, and $V_{Mc}$ 76, which are the midpoint voltages of the three totem-pole legs (e.g., corresponding legs 16A, 16B, and 16C), and the three PFC inductor currents $i_{La}$ 78, $i_{Lb}$ 80, and $i_{Lc}$ 82. The waveforms of the midpoint voltages 72, 74, and 76 of the totem-pole legs also include the switching-cycle-averaged values of the midpoint voltages. Digressing briefly, it is noted that practically speaking, the midpoint voltages 72, 74, and 76 cannot be reliably measured given that each represents an ever-changing signal (e.g., a jumpy signal), as represented by the blocks that overlap the underlying average sinusoidal signal located within. Additionally, filtering of the jumpy signal is also not a practical approach to obtaining information of the underlying average signal. The use of level-shifting (e.g., shifting up the sinusoidal signal by $V_o/2$) is based on the recognition that the input phase voltages (level-shifted by $V_o/2$) contain the same information as the midpoint voltages, yet represents a more practical signal for processing. In FIG. 11, it is nicely illustrated that the waveforms of the phase-to-neutral voltages, level shifted by $V_o/2$ (e.g., waveforms 66, 68, and 70), coincide with the waveforms of the switching-cycle-averaged midpoint voltages (72, 74, and 76, respectively). Accordingly, to detect the interval of $V_o/3$-$2V_o/3$, such as shown by interval $PS_c$ in $V_{Mc}$ waveform 76, certain embodiments of the segment detection$_x$ block 26B detect the interval based on comparison of the voltage level of a (level-shifted) phase-to-neutral voltage $V_{cLS}$ to $V_o/3$ and $2V_o/3$ (with the upper and lower voltages shown on the right-hand side in FIG. 11 adjacent waveforms 66, 68, and 70).

Figure 12A:
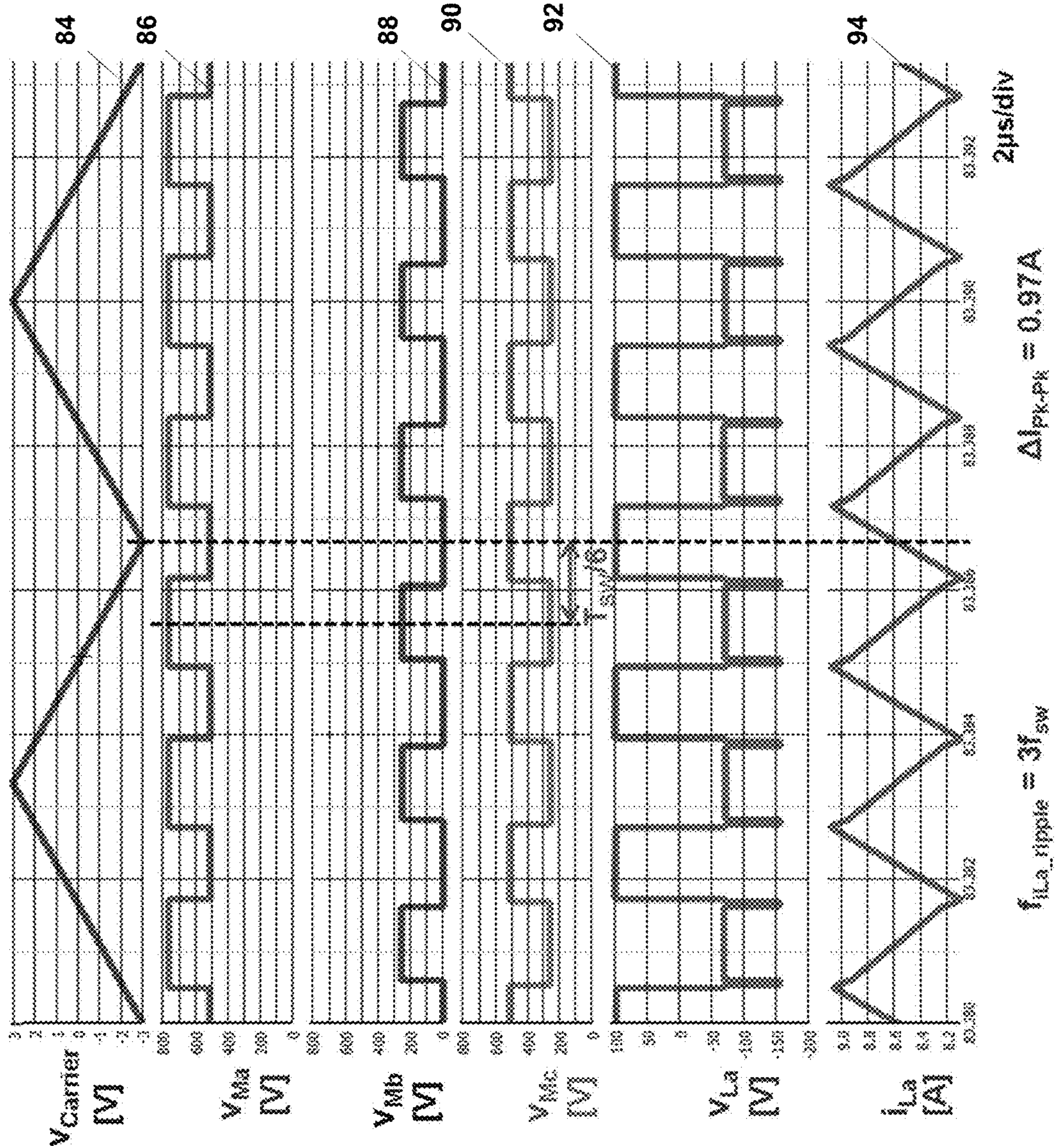
FIGS. 12A-12B are simulated waveform diagrams showing an example operation of the 3-phase FC 4-level boost PFC rectifier without additional phase shift control and with additional phase shift control, respectively, in accordance with one embodiment.
Figure 12B:
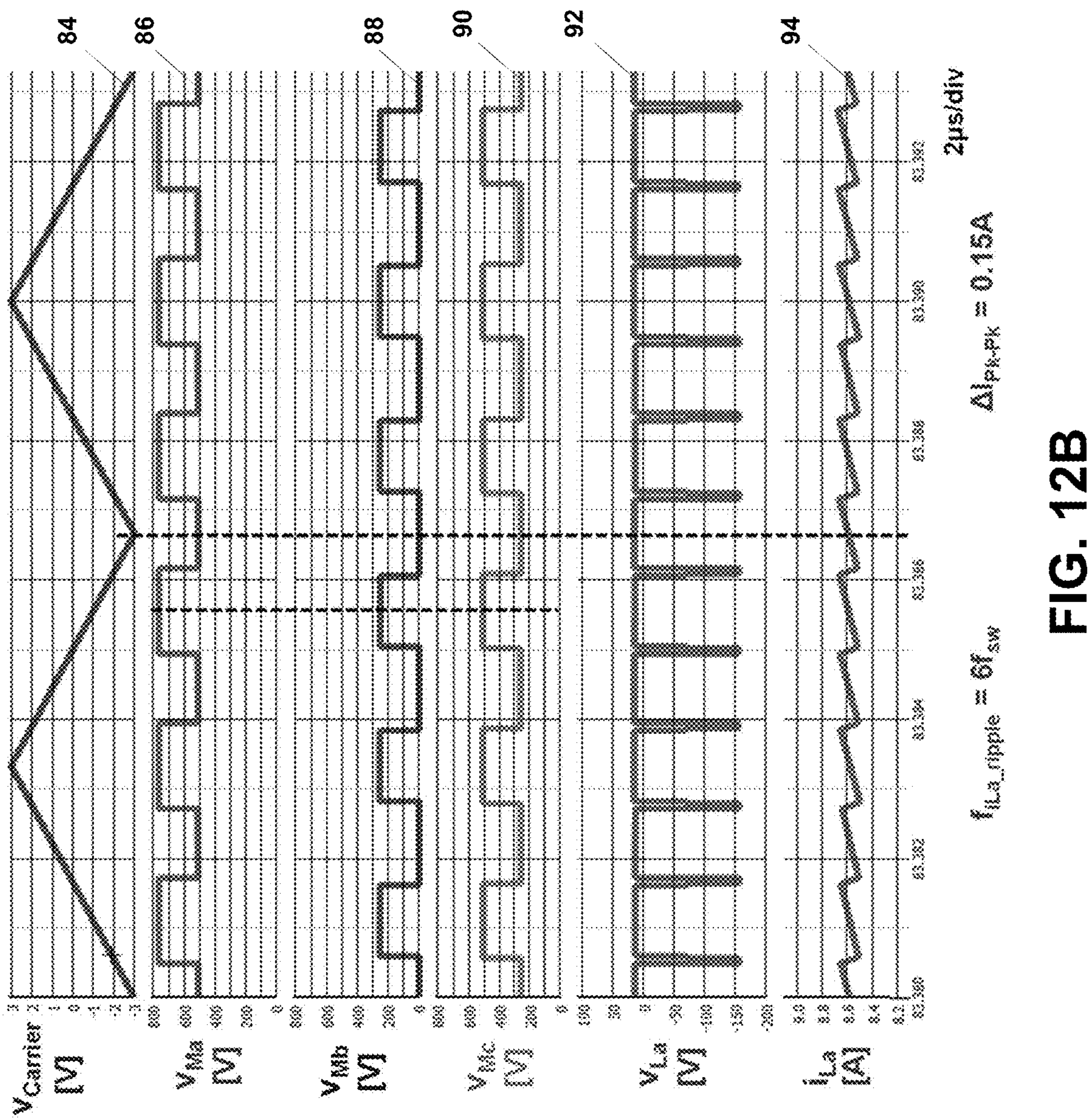

The waveforms in FIG. 12A illustrate the 4-L operation without additional phase shift control, whereas the waveforms in FIG. 12B illustrate the operation with additional phase shift control. The waveforms in FIGS. 12A and 12B, from top to bottom, include the basic triangular carrier 84, $V_{Ma}$ 86, $V_{Mb}$ 88, and $V_{Mc}$ 90, which are the midpoint voltages of the three totem-pole legs, "a" phase boost inductor voltage $V_{La}$ 92 and current $i_{La}$ 94, all zoomed-in in the segment of a line cycle, where $V_o/3 \le v_{Mc} \le 2V_o/3$, around the positive-to-negative zero crossing of inductor current $i_{Lc}$. It is shown in FIG. 12A that the midpoint voltage of totem-pole leg "c" ($V_{Mc}$ 90) is not central aligned with the midpoint voltages of the other two totem-pole legs ($V_{Ma}$ 86, $V_{Mb}$ 88), but it is phase shifted by $T_{SW}/6$. It is also shown in FIG. 12A that the ripple frequency of the "a" phase PFC inductor current $i_{La}$ 94 is 3× the switching frequency, i.e., $f_{ripple,iLa}=3f_{SW}$, which is the result of the 3-phase 4-level boost PFC operation with flying capacitors. By phase shifting the midpoint voltage $V_{Mc}$ 90 of totem-pole leg "c" by $T_{SW}/6$, the midpoint voltages of all three totem-pole legs are central aligned, as shown in FIG. 12B, resulting in doubling the ripple frequency of the PFC inductor current, i.e., $f_{ripple,iLa}=6f_{SW}$, and in significantly decreased (e.g., from 0.97 A to 0.15 A or ~6.5×) peak-to-peak value of the PFC inductor current ripple.

Figure 13A:
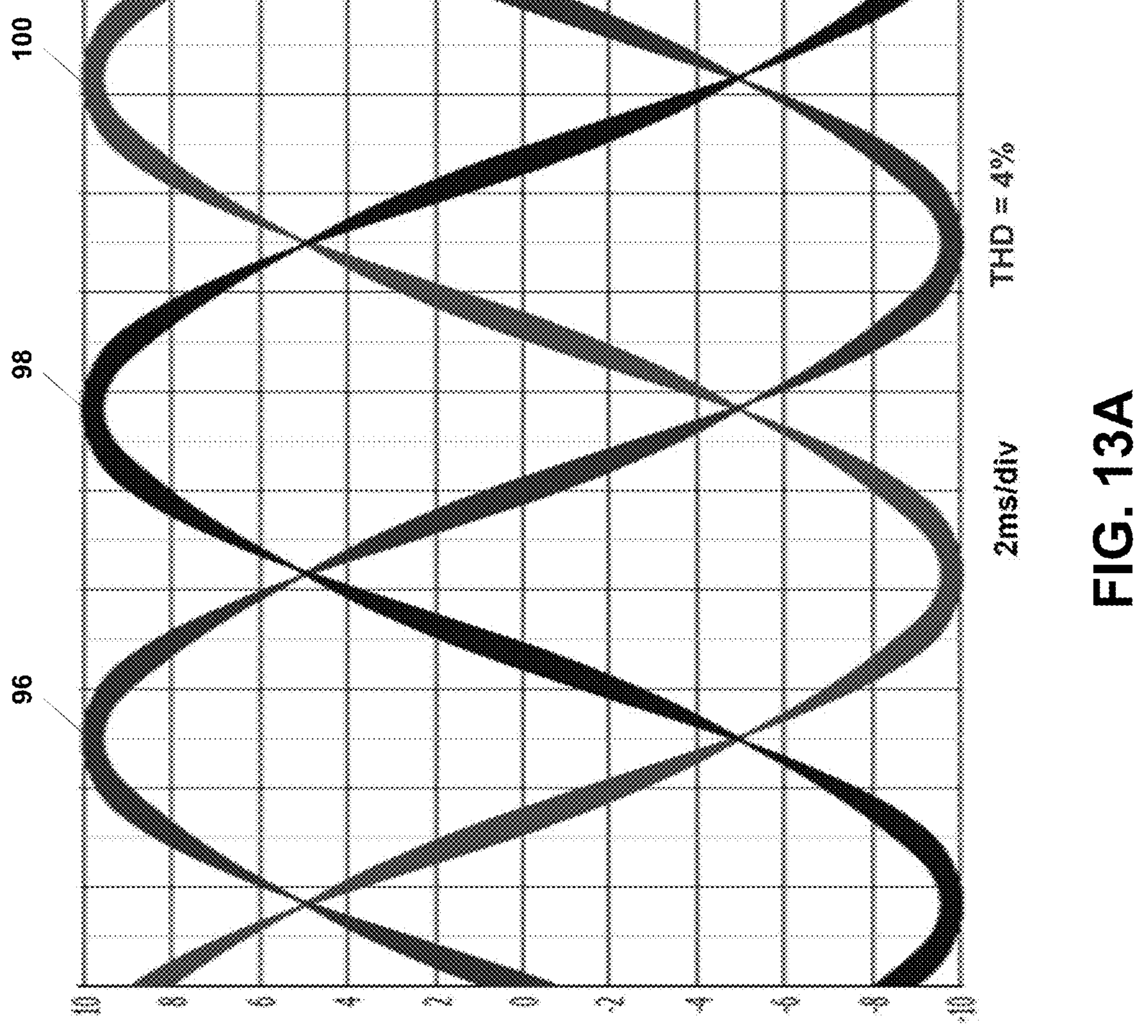
FIGS. 13A-13B are simulated waveform diagrams corresponding to the PFC inductors currents of the example 3-phase FC 4-level boost PFC without additional phase shift control and with additional phase shift control, respectively, in accordance with one embodiment.
Figure 13B:
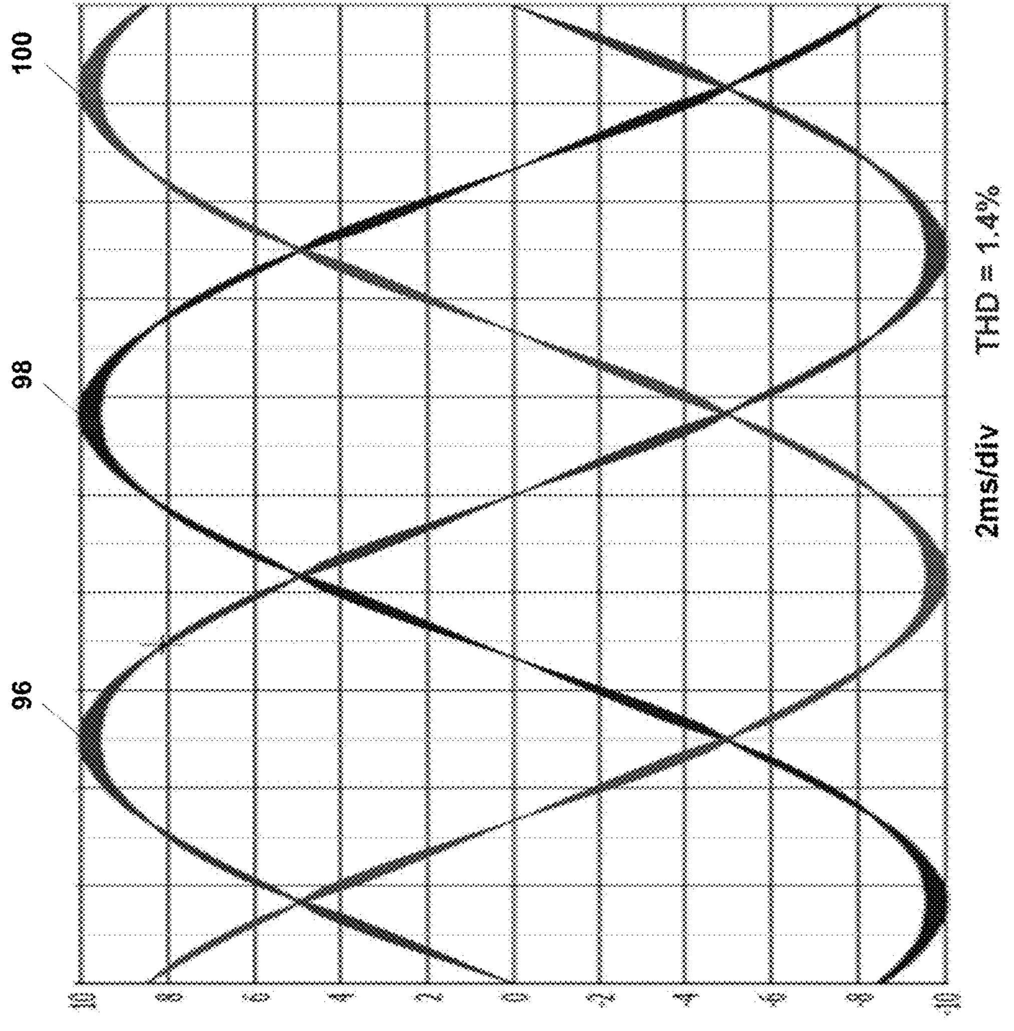
Figure 14:
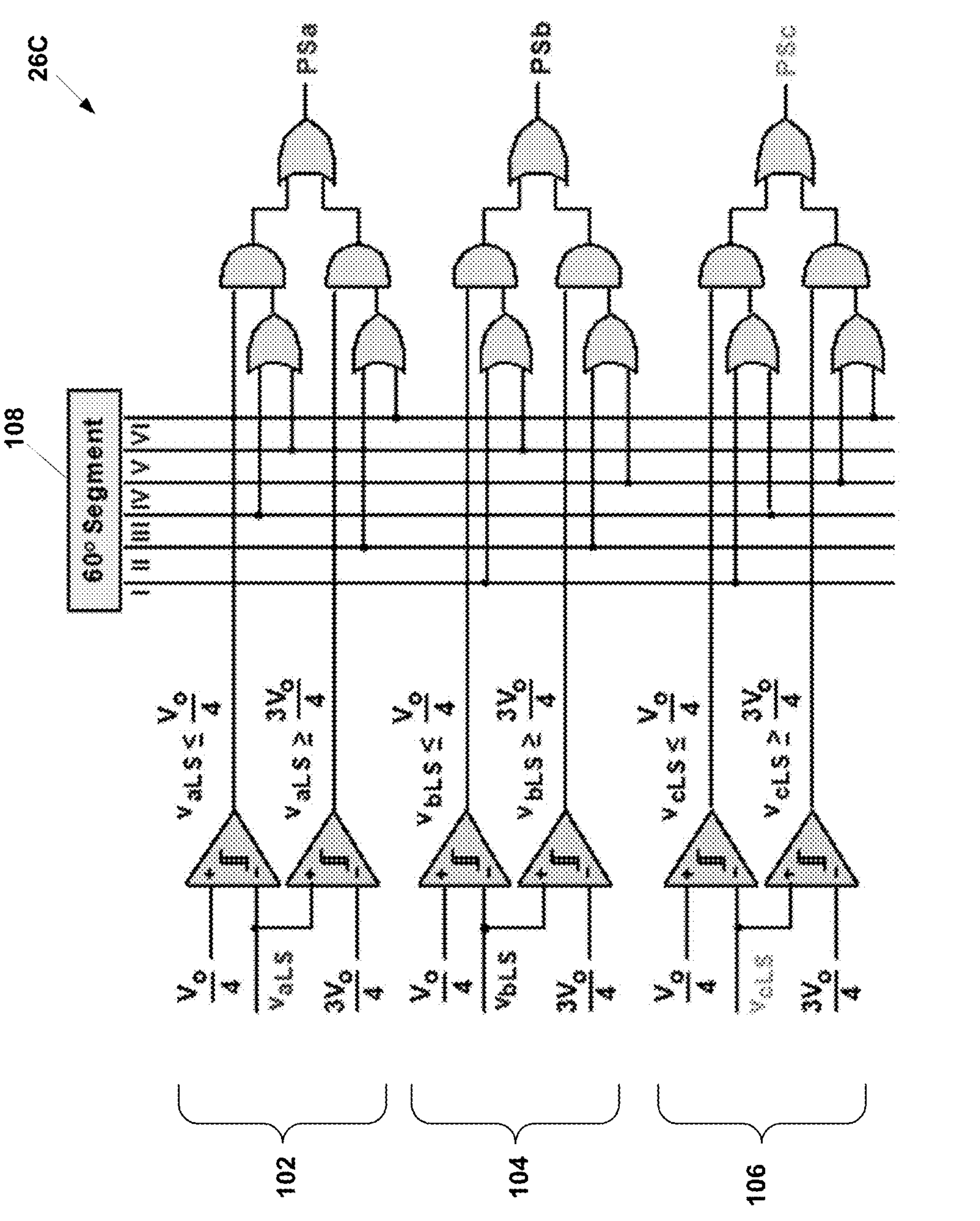
FIG. 14 shows a schematic diagram of an embodiment of an example circuit for the PS segment detection$_x$ block of FIG. 4 for a 3-phase 5-level boost PFC rectifier with flying capacitors.

The waveforms of the currents of the PFC inductors of the 3-phase FC 4-level boost PFC rectifier within a line cycle are shown in FIG. 13A-13B without additional phase shift control (FIG. 13A) and with additional phase shift control (FIG. 13B). In FIGS. 13A-13B, shown are waveforms for $I_{La}$ 96, $i_{Lb}$ 98, and $i_{Lc}$ 100 (e.g., in units of Amperes (A)). It is shown in FIG. 13B that the ripple of the PFC inductors' currents with additional phase shift control significantly decreases compared to that without additional phase shift control in the whole line cycle, resulting in a significantly decreased total harmonic distortion (e.g., from approximately 4% THD to 1.4% or ~2.9×).

In case of 3-phase 5-level boost PFC rectifier with flying capacitors, according to yet another embodiment of the present invention, an additional phase shift of $T_{SW}/8$ is implemented in the totem-pole leg associated with the input phase voltage by the following control algorithm:

$$PS_a=\left(v_{aLS}\le\frac{V_o}{4}\right)\cdot(Seg\ III+Seg\ V)+\left(v_{aLS}\ge\frac{3V_o}{4}\right)\cdot(Seg\ II+Seg\ VI),$$

$$PS_b=\left(v_{bLS}\le\frac{V_o}{4}\right)\cdot(Seg\ I+Seg\ V)+\left(v_{bLS}\ge\frac{3V_o}{4}\right)\cdot(Seg\ II+Seg\ IV),$$

$$PS_c=\left(v_{cLS}\le\frac{V_o}{4}\right)\cdot(Seg\ I+Seg\ III)+\left(v_{cLS}\ge\frac{3V_o}{4}\right)\cdot(Seg\ IV+Seg\ VI),$$

where, $V_{xLS}$, X∈{a, b, c}, is the phase-to-neutral voltage $v_{xn}$ level shifted by $V_o/2$, and Seg X, X∈{I, II, III, IV, V, VI}, is a 60° segment of a line cycle defined in association with FIG. 7A. As shown above, the proper input phase is detected by sensing the phase-to-neutral voltages, level shifted by $V_o/2$, as well as by detecting the proper 60° segment in a line cycle as similarly described above. Specifically, an additional phase shift of $T_{SW}/8$ is implemented in the totem-pole leg associated with the input phase whose voltage level, or in particular, phase-to-neutral voltage, level shifted by $V_o/2$, is less than $V_o/4$ or greater than $3V_o/4$ in the relevant 60° segments of a line cycle. One embodiment of an example circuit of the PS segment detection$_x$ block 26, described in association with FIGS. 3-4, is shown for the 3-phase 5-level boost PFC rectifier with flying capacitors in FIG. 14, the PS segment detection$_x$ block denoted with reference numeral 26C. The PS segment detection$_x$ block 26C includes sets of comparators 102 (for $V_{aLS}$), 104 (for $V_{bLS}$), and 106 (for $V_{cLS}$) for determining the level-shifted input phase voltages with voltage level values that are less than $V_o/4$ or greater than $3V_o/4$. The PS segment detection$_x$ block 26C also includes a 60° Segment block 108, as similarly described above for the decoding and truth table in association with FIGS. 7B-7C, which determines the relevant 60° segments of a line cycle. The PS segment detection$_x$ block 26C also includes additional logic that uses the information from the sets of comparators 102, 104, and 106 and the 60° Segment block 108 to implement the control algorithm above to determine the phase-shift outputs $PS_a$, $PS_b$, and $PS_c$.

Figure 15:
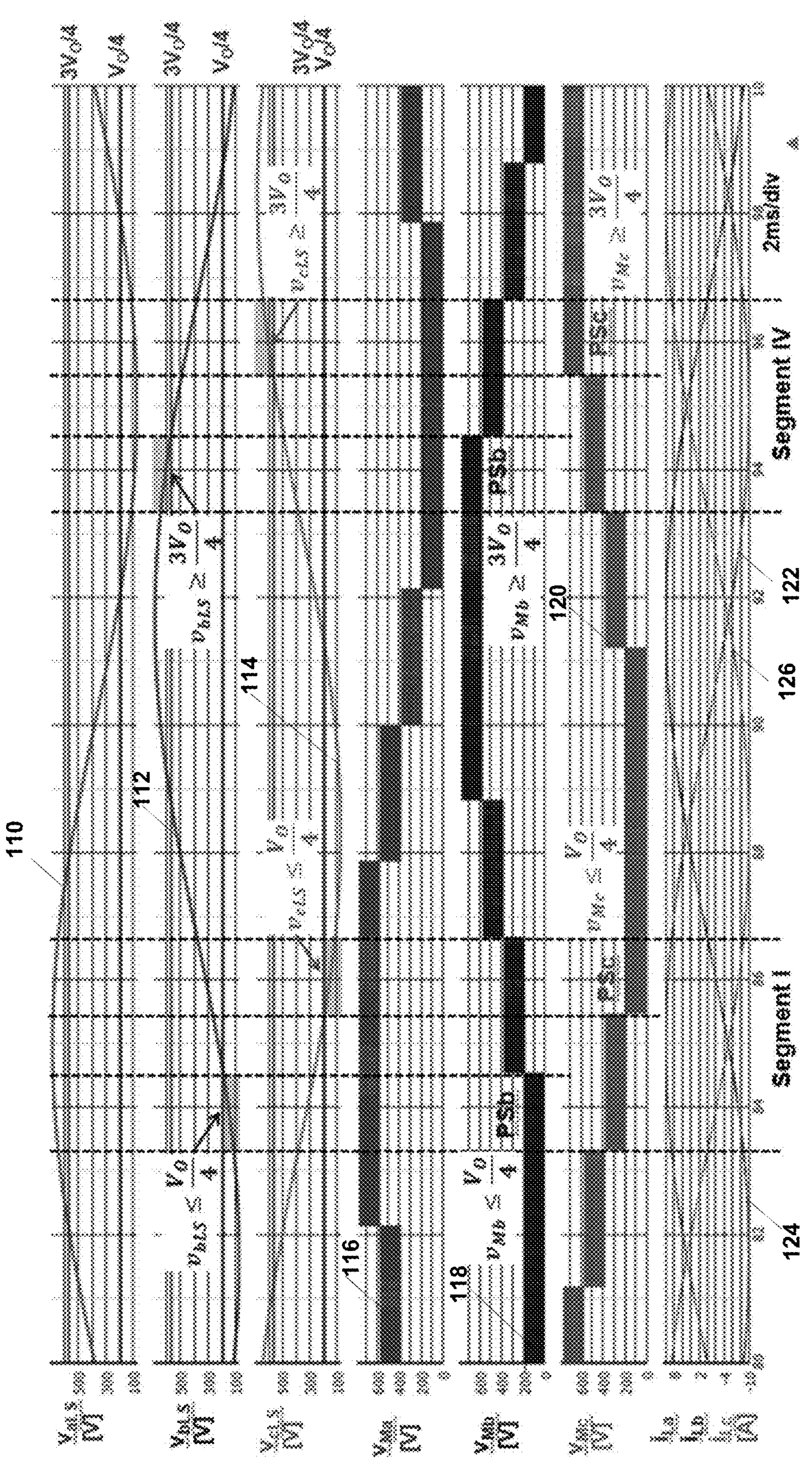
FIG. 15 shows simulated waveform diagrams showing an embodiment of an example input phase detection method for additional phase shift control by sensing the phase-to-neutral voltages, level shifted by $V_o/2$, in the 3-phase FC 5-level boost PFC rectifier.

To illustrate the operation of the 3-phase FC 5-level boost PFC rectifier with additional phase-shift control, important simulation waveforms, obtained on a 4.5 kW 3-phase FC4L boost PFC rectifier with inductors, $L_{a,b,c}$=50 uH, with three independent average current mode controllers operating at 150 kHz switching frequency, at 3×220 Vrms, 50 Hz input voltage and 760V output voltage, are shown in FIGS. 15-17. The waveforms in FIG. 15, from top to bottom, include $V_{aLS}$ 110, $V_{bLS}$ 112, and $V_{cLS}$ 114, which are the three phase-to-neutral voltages level shifted by $V_o/2$, $V_{Ma}$ 116, $V_{Mb}$ 118, and $V_{Mc}$ 120, which are the midpoint voltages of the three totem-pole legs, and the three PFC inductor currents $I_{La}$ 122, $i_{Lb}$ 124, and $i_{Lc}$ 126.

In FIG. 15, it is nicely illustrated that the input phase for additional phase shift control is detected by sensing the phase-to-neutral voltages, level shifted by $V_o/2$. For example, in Segment I of a line cycle, additional phase shift control is applied in input phase "b" ($PS_b$) when $V_{Mb}<V_o/4$ and in input phase "c" ($PS_c$) when $v_{Mc}\le V_o/4$. These intervals are detected by sensing the voltage levels, or more particularly, the phase-to-neutral voltages, level shifted by $V_o/2$: $V_{bLS}\le V_o/4$ ($V_{bLS}$ waveform 112) and $v_{cLS}\le V_o/4$ ($V_{cLS}$ waveform 114), respectively. Similar to the description above in association with the 4-L PS segment detectionx, the use of the level-shifted phase-to-neutral voltages in segment detection for 5-L enables a practical signal detection for the comparison of the voltage levels as compared to the jumpy midpoint voltage signals.

Figure 16A:
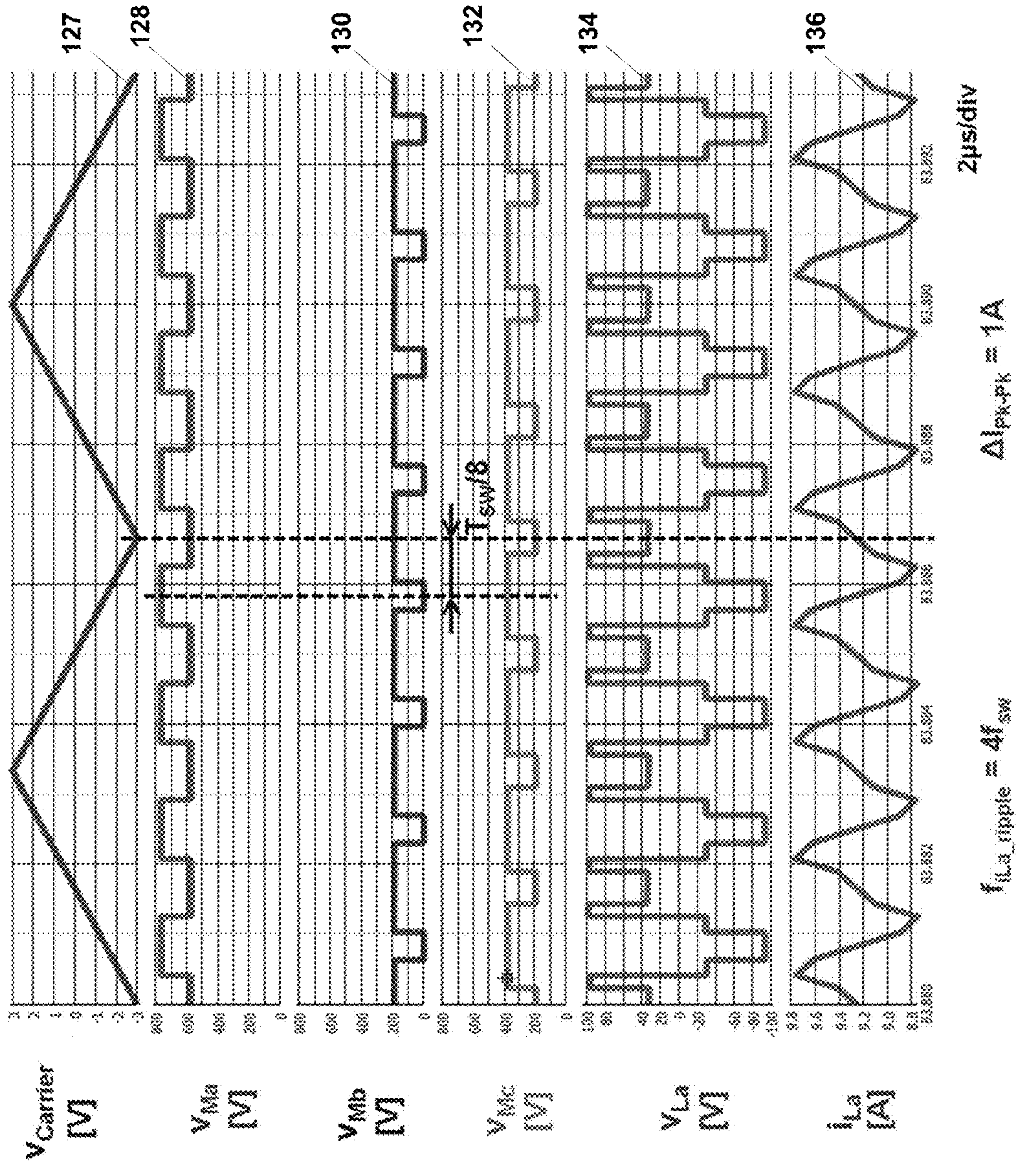
FIGS. 16A-16B are simulated waveform diagrams showing an example operation of an example 3-phase FC 5-level boost PFC rectifier without additional phase shift control and with additional phase shift control, respectively, in accordance with one embodiment.
Figure 16B:
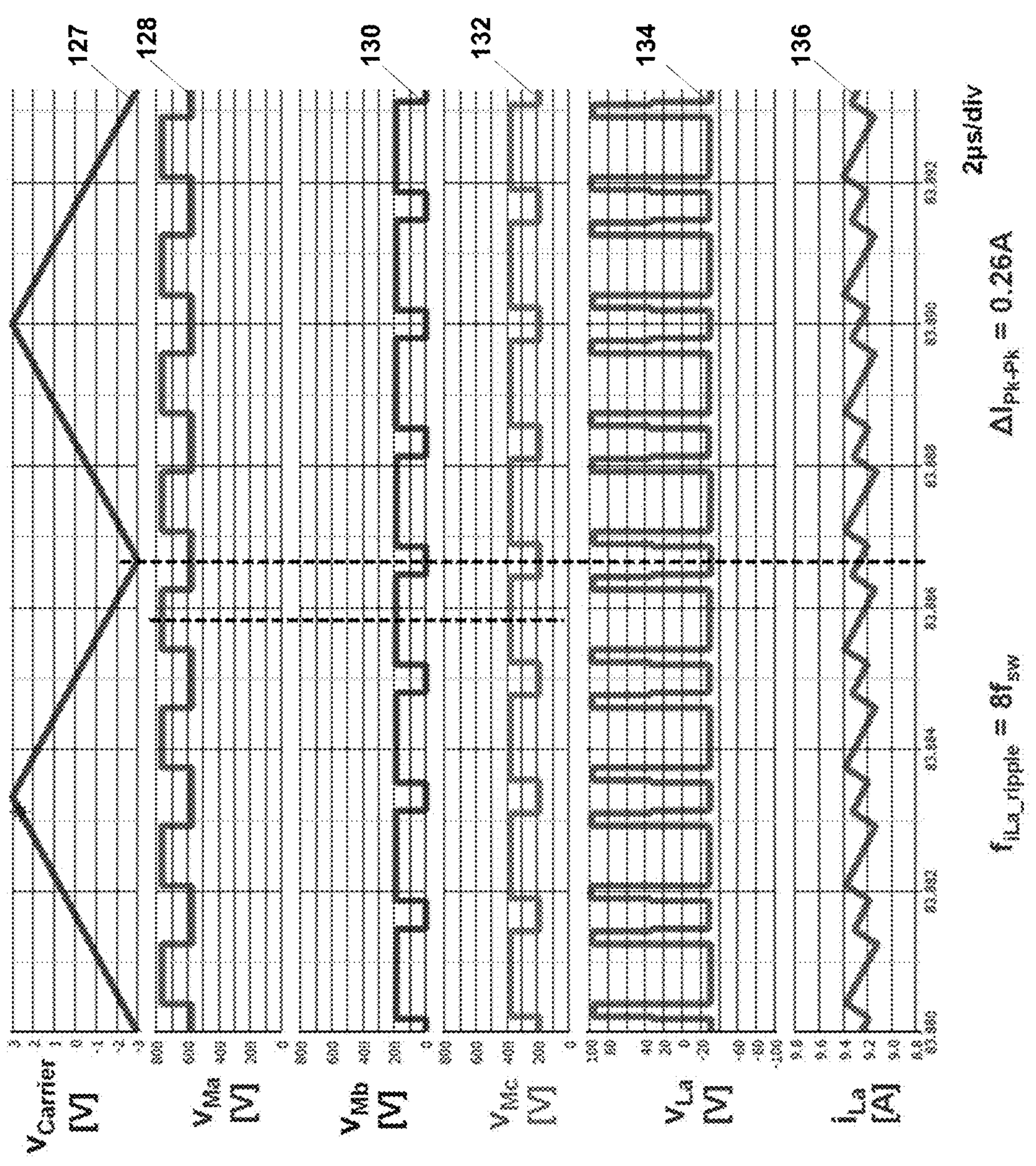

The waveforms in FIG. 16A illustrate the 5-L operation without additional phase shift control, whereas the waveform in FIG. 16B illustrate the 5-L operation with additional phase shift control. The waveforms in FIGS. 16A-16B, from top to bottom, include the basic triangular carrier 127, $V_{Ma}$ 128, $V_{Mb}$ 130, and $V_{Mc}$ 132, which are the midpoint voltages of the three totem-pole legs, "a" phase boost inductor voltage $V_{La}$ 134 and current $i_{La}$ 136, all zoomed-in in Segment I of the line cycle, around the middle of voltage level interval where $V_{Mb}\le V_o/4$. It is shown in FIG. 16A that the midpoint voltage, $V_{Mb}$ 130, of totem-pole leg "b" is not central aligned with the midpoint voltages ($V_{Ma}$ 128 and $V_{Mc}$ 132) of the other two totem-pole legs, but it is phase shifted by $T_{SW}/8$. It is also shown in FIG. 16A that the ripple frequency of the "a" phase PFC inductor current, $i_{La}$ 136, is 4x the switching frequency, i.e., $f_{ripple,iLa}=4f_{SW}$, which is the result of the 3-phase 5-level boost PFC operation with flying capacitors. By phase shifting the midpoint voltage $V_{Mb}$ 130 of totem-pole leg "b" by $T_{SW}/8$, the midpoint voltages of all three totem-pole legs are central aligned, as shown in FIG. 16B, resulting in doubled ripple frequency of the PFC inductor current, i.e., $f_{ripple,iLa}=8f_{sw}$, and in significantly decreased (from 1 A to 0.26 A or ~3.8×) peak-to-peak value of the PFC inductor current ripple.

Figure 17A:
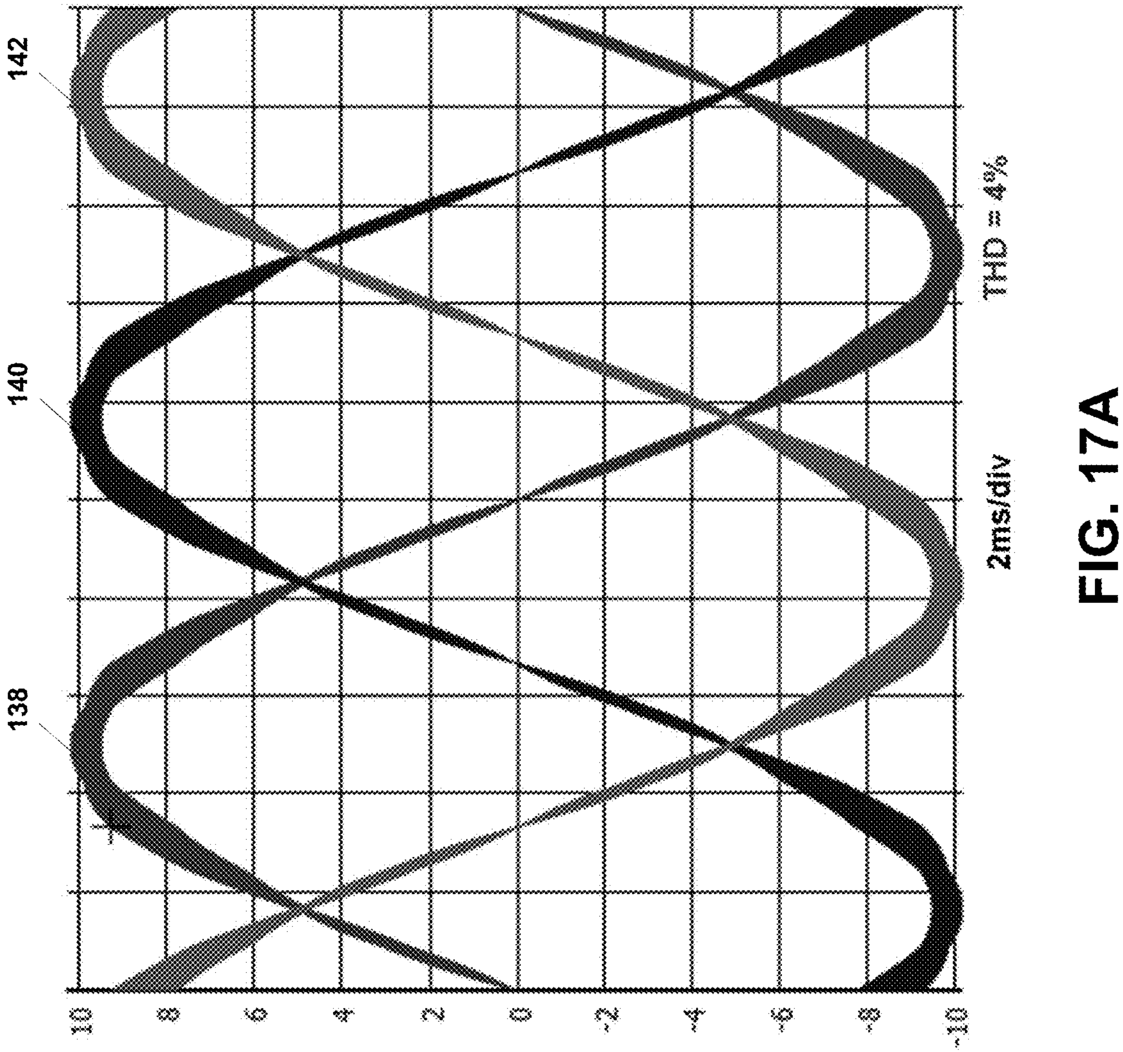
FIGS. 17A-17B are simulated waveform diagrams corresponding to the PFC inductors currents of the 3-phase FC 5-level boost PFC rectifier without additional phase shift control and with additional phase shift control, respectively, in accordance with one embodiment.
Figure 17B:
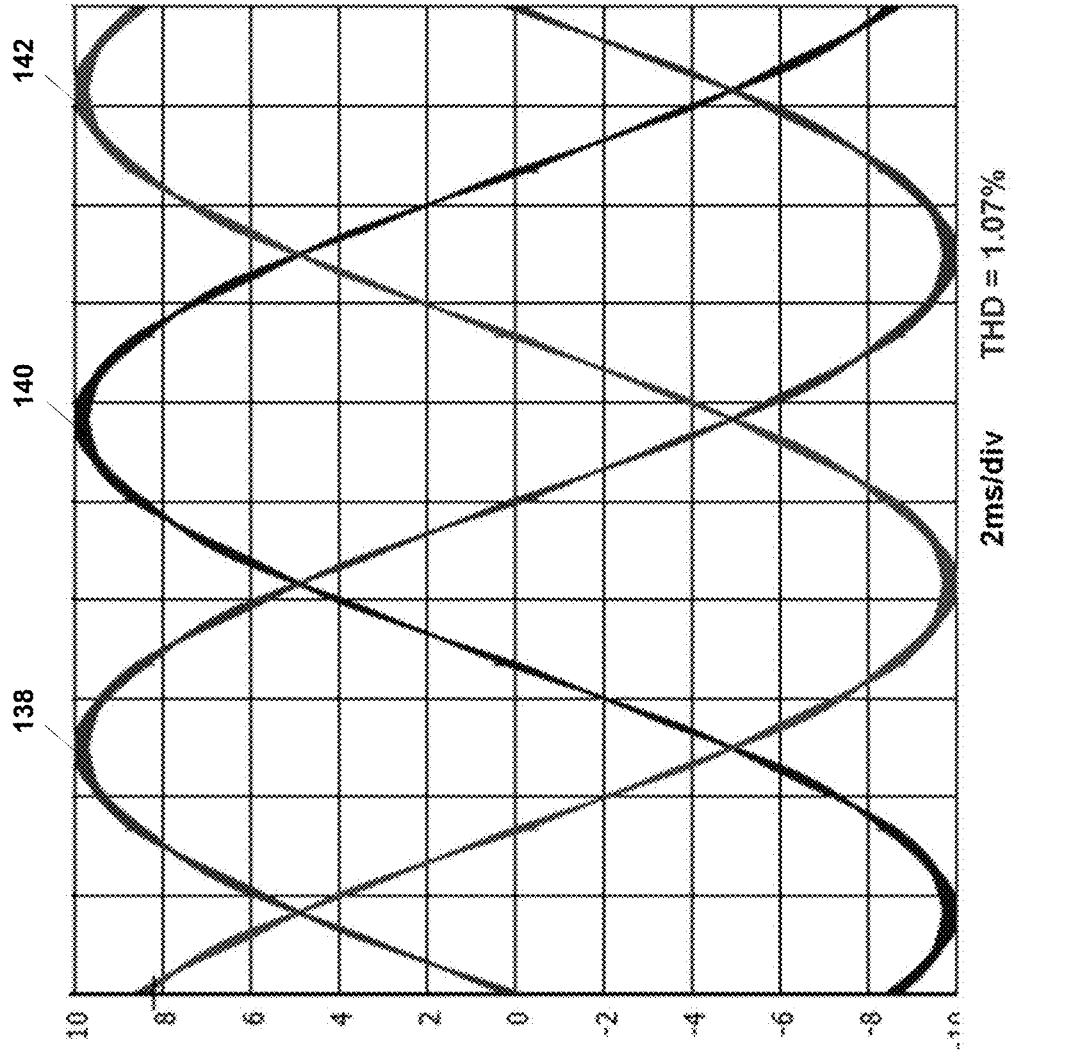

The waveforms of the currents of the PFC inductors of the 3-phase FC 5-level boost PFC within a line cycle are shown in FIG. 17A without additional phase shift control and FIG. 17B with additional phase shift control. In FIGS. 17A-17B, shown are waveforms for $I_{La}$ 138, $i_{Lb}$ 140, and $i_{Lc}$ 142 (e.g., in units of Amperes (A)). It is shown in FIG. 17B that the ripple of the PFC inductors currents with additional phase shift control significantly decreases compared to that without additional phase shift control (FIG. 17A) in the whole line cycle, resulting in a significantly decreased total harmonic distortion (approximately 4% to 1.07% or ~3.7×).

In case of 3-phase N>5 level boost PFC with flying capacitors, according to the present invention, the same generalized method can be employed. First, by observing the midpoint voltages of the three totem-pole legs, an input phase and the corresponding segments of a line cycle are identified where additional phase shift control should be applied. Then, the additional phase shift control is implemented by sensing the phase-to-neutral voltages, level shifted by $V_o/2$, and by detecting the 60° segments of a line cycle, where one phase-to neutral voltage has the maximum absolute value.

The control circuit 14 may be implemented using hardware, software (including firmware), or a combination of hardware and software. For instance, the control circuit 14 may be implemented using a digital signal processor (DSP), micro-controller, including the use of the following technologies existing in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 18:
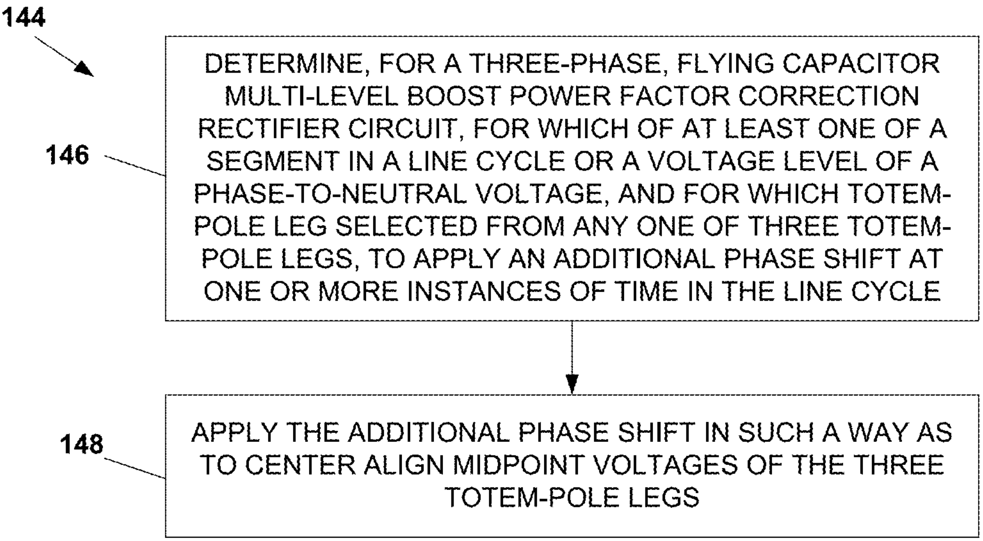
FIG. 18 shows a flow diagram of an embodiment of an example method to reduce inductor current ripple in a three-phase, flying capacitor multi-level PFC rectifier.

Having described certain embodiments of a three-phase, flying capacitor multi-level (FCML) boost power factor correction (PFC) rectifier and method, it should be appreciated within the context of the present disclosure that one embodiment of a control method, denoted control method 144 in FIG. 18, is disclosed. The control method 144 may be used for a three-phase, flying capacitor multi-level (FCML) boost power factor correction (PFC) rectifier circuit having three legs. The control method 144 includes determining, for the three-phase, flying capacitor multi-level boost power factor correction rectifier circuit, for which of at least one of a segment in a line cycle or a voltage level of a phase-to-neutral voltage, and for which totem-pole leg selected from any one of the three totem-pole legs, to apply an additional phase shift at one or more instances of time in the line cycle (146); and applying the additional phase shift in such a way as to center align midpoint voltages of the three totem-pole legs (148).

Having described certain embodiments of a three-phase, flying capacitor multi-level boost power factor correction rectifier and associated method, and with reference to FIGS. 1-18, it should be appreciated that one example embodiment includes a method (144) to reduce inductor current ripple in a three-phase, flying capacitor multi-level boost power factor correction rectifier circuit (12) having three totem-pole legs (16A, 16B, 16C), the method including: determining, for the three-phase, flying capacitor multi-level boost power factor correction rectifier circuit, for which of at least one of a segment in a line cycle or a voltage level of a phase-to-neutral voltage, and for which totem-pole leg selected from any one of the three totem-pole legs, to apply an additional phase shift at one or more instances of time in the line cycle (146); and applying the additional phase shift in such a way as to center align midpoint voltages of the three totem-pole legs (148).

The example method embodiment may include one or a combination of the following features.

For the example method embodiment, applying the additional phase shift includes applying the additional phase shift to gate pulses provided to switches of only one of the three totem-pole legs associated with the at least one of the segment in the line cycle or the voltage level of the phase-to-neutral voltage at any of the one or more instances of time.

For the example method embodiment, applying the additional phase shift includes selecting from one of two sets of pulse-width modulation pulses, wherein each set of the pulse-width modulation pulses is associated with one of two sets of carrier signals, the two sets of carrier signals comprising a phase shift of $T_{SW}/[2(N-1)]$, wherein each set of the two sets of carrier signals comprises N−1 carrier signals, and wherein each consecutive carrier signal is phase shifted by $T_{SW}/(N-1)$, where N is equal to a multi-level number.

For the example method embodiment, the determining is made according to the level of the three-phase, flying capacitor multi-level boost power factor correction rectifier circuit.

For the example method embodiment, the three-phase, flying capacitor multi-level boost power factor correction rectifier circuit includes a three-phase, flying capacitor 3-level boost power factor correction rectifier circuit, wherein the determining includes: dividing the line cycle into six sixty-degree segments, wherein each of the six sixty-degree segments consists of one of three phase-to-neutral voltages at an absolute maximum voltage value relative to the other two phase-to-neutral voltages (34); and determining a current segment of the line cycle based on a comparison of voltage levels of the three phase-to-neutral voltages relative to zero (26A, 42).

For the example method embodiment, for the three-phase, flying capacitor 3-level boost power factor correction rectifier circuit, applying the additional phase shift includes applying a phase shift of $T_{SW}/4$ to gate pulses provided to switches of one of the totem-pole legs that corresponds to the absolute maximum value of the phase-to-neutral voltage for the current segment.

For the example method embodiment, the three-phase, flying capacitor multi-level boost power factor correction rectifier circuit includes a three-phase, flying capacitor 4-level boost power factor correction rectifier circuit, wherein the determining includes: level-shifting, by one-half an output voltage, three phase-to-neutral voltages of the three totem-pole legs for the line cycle; and determining which one of the three level-shifted phase-to-neutral voltages lies between one-third the output voltage and two-thirds the output voltage, inclusive (26B).

For the example method embodiment, for the three-phase, flying capacitor 4-level boost power factor correction rectifier circuit, applying the additional phase shift includes applying a phase shift of $T_{SW}/6$ to gate pulses provided to switches of one of the totem-pole legs corresponding to the level-shifted phase-to-neutral voltages that lies between one-third the output voltage and two-thirds the output voltage, inclusive.

For the example method embodiment, the three-phase, flying capacitor multi-level boost power factor correction rectifier circuit includes a three-phase, flying capacitor 5-level boost power factor correction rectifier circuit, wherein determining includes: dividing the line cycle into six sixty-degree segments; level-shifting, by one-half an output voltage, three phase-to-neutral voltages of the three totem-pole legs for the line cycle; determining a current segment of the line cycle; and determining which of the three level-shifted phase-to-neutral voltages is less than or equal to one-fourth the output voltage, or greater than or equal to three-fourths the output voltage, for the current segment (26C).

For the example method embodiment, for the three-phase, flying capacitor 5-level boost power factor correction rectifier circuit, applying the additional phase shift includes applying a phase shift of $T_{SW}/8$ to gate pulses provided to switches of at least one of the totem-pole legs corresponding to the level-shifted phase-to-neutral voltage that is less than or equal to one-fourth the output voltage, or greater than or equal to three-fourths the output voltage, for the current segment.

Having described certain embodiments of a three-phase, flying capacitor multi-level boost power factor correction rectifier and associated method, and with reference to FIGS. 1-18, it should be appreciated that one example embodiment includes a power factor correction rectifier (10), including: a three-phase, flying capacitor multi-level boost power factor correction rectifier circuit (12) comprising three totem-pole legs (16A, 16B, 16C), each of the totem-pole legs comprising switches arranged in pairs with each pair coupled to a flying capacitor; and a control circuit (14) configured to: determine for which of at least one of a segment in a line cycle or a voltage level of a phase-to-neutral voltage, and for which totem-pole leg selected from any one of the three totem-pole legs, to apply an additional phase shift at one or more instances of time in the line cycle (146); and apply the additional phase shift in such a way as to center align midpoint voltages of the three totem-pole legs (148).

For the example power factor correction rectifier embodiment, the control circuit is configured to apply the additional phase shift by applying the additional phase shift to gate pulses provided to the switches of only one of the three totem-pole legs associated with the at least one of the segment in the line cycle or the voltage level of the phase-to-neutral voltage at any of the one or more instances of time.

For the example power factor correction rectifier embodiment, the control circuit is configured to apply the additional phase shift by selecting from one of two sets of pulse-width modulation pulses, wherein each set of the pulse-width modulation pulses is associated with one of two sets of carrier signals, the two sets of carrier signals comprising a phase shift of $T_{SW}/[2(N-1)]$, wherein each set of the two sets of carrier signals comprises N−1 carrier signals, and wherein each consecutive carrier signal is phase shifted by $T_{SW}/(N-1)$, where N is equal to a multi-level number.

For the example power factor correction rectifier embodiment, the control circuit is configured to determine according to the level of the three-phase, flying capacitor multi-level boost power factor correction rectifier circuit.

For the example power factor correction rectifier embodiment, the three-phase, flying capacitor multi-level boost power factor correction rectifier circuit includes a three-phase, flying capacitor 3-level boost power factor correction rectifier circuit, wherein the control circuit is configured to determine by: dividing the line cycle into six sixty-degree segments, wherein each of the six sixty-degree segments consists of one of the three phase-to-neutral voltages at an absolute maximum voltage value relative to the other two phase-to-neutral voltages (34); and determining a current segment of the line cycle based on a comparison of voltage levels of the three phase-to-neutral voltages relative to zero (26A, 42).

For the example power factor correction rectifier embodiment, for the three-phase, flying capacitor 3-level boost power factor correction rectifier circuit, the control circuit is configured to apply the additional phase shift by applying a phase shift of $T_{SW}/4$ to gate pulses provided to the switches of one of the totem-pole legs that corresponds to the absolute maximum value of the phase-to-neutral voltage for the current segment.

For the example power factor correction rectifier embodiment, the three-phase, flying capacitor multi-level boost power factor correction rectifier circuit includes a three-phase, flying capacitor 4-level boost power factor correction rectifier circuit, wherein the control circuit is configured to determine by: level-shifting, by one-half an output voltage, three phase-to-neutral voltages of the three totem-pole legs for the line cycle; and determining which of the three level-shifted phase-to-neutral voltages lies between one-third the output voltage and two-thirds the output voltage, inclusive (26B).

For the example power factor correction rectifier embodiment, for the three-phase, flying capacitor 4-level boost power factor correction rectifier circuit, the control circuit is configured to apply the additional phase shift by applying a phase shift of $T_{SW}/6$ to gate pulses provided to the switches of one of the totem-pole legs corresponding to the level-shifted phase-to-neutral voltages that lies between one-third the output voltage and two-thirds the output voltage, inclusive.

For the example power factor correction rectifier embodiment, the three-phase, flying capacitor multi-level boost power factor correction rectifier circuit includes a three-phase, flying capacitor 5-level boost power factor correction rectifier circuit, wherein the control circuit is configured to determine by: dividing the line cycle into six sixty-degree segments; level-shifting, by one-half an output voltage, three phase-to-neutral voltages of the three totem-pole legs for the line cycle; determining a current segment of the line cycle; and determining which of the three level-shifted phase-to-neutral voltages is less than or equal to one-fourth the output voltage, or greater than or equal to three-fourths the output voltage, for the current segment (26C).

For the example power factor correction rectifier embodiment, for the three-phase, flying capacitor 5-level boost power factor correction rectifier circuit, the control circuit is configured to apply the additional phase shift by applying a phase shift of $T_{SW}/8$ to gate pulses provided to the switches of at least one of the totem-pole legs corresponding to the level-shifted phase-to-neutral voltage that is less than or equal to one-fourth the output voltage, or greater than or equal to three-fourths the output voltage, for the current segment.

Note that use of the term, inclusive, refers to the inclusion of an upper value and lower value. For instance, in the aforementioned embodiment that includes determining which of the three level-shifted phase-to-neutral voltages lies between one-third the output voltage and two-thirds the output voltage, inclusive (26B), inclusive refers to level-shifted phase-to-neutral voltages that include the upper and lower values (e.g., one-third the output voltage and two-thirds the output voltage), such that the determining includes the range of values that lie between the upper and lower values, as well as the upper and lower values ($V_o/3$ and $2V_o/3$).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

At least the following is claimed:

1. A method to reduce inductor current ripple in a three-phase, flying capacitor multi-level boost power factor correction rectifier circuit having three totem-pole legs, the method comprising:

determining, for the three-phase, flying capacitor multi-level boost power factor correction rectifier circuit, for which of at least one of a segment in a line cycle or a voltage level of a phase-to-neutral voltage, and for which totem-pole leg selected from the three totem-pole legs, to apply an additional phase shift at one or more instances of time in the line cycle; and applying the additional phase shift in such a way as to center align midpoint voltages of the three totem-pole legs, wherein the determining is made according to the level of the three-phase, flying capacitor multi-level boost power factor correction rectifier circuit.

2. The method of claim 1, wherein applying the additional phase shift comprises applying the additional phase shift to gate pulses provided to switches of only one of the three totem-pole legs associated with the at least one of the segment in the line cycle or the voltage level of the phase-to-neutral voltage at one or more instances of time.

3. The method of claim 2, wherein applying the additional phase shift comprises selecting from one of two sets of pulse-width modulation pulses, wherein each set of the pulse-width modulation pulses is associated with one of two sets of carrier signals, the two sets of carrier signals comprising a phase shift of $T_{SW}/[2(N-1)]$, wherein each set of the two sets of carrier signals comprises N−1 carrier signals, and wherein each consecutive carrier signal is phase shifted by $T_{SW}/(N-1)$, where N is equal to a multi-level number.

4. The method of claim 1, wherein the three-phase, flying capacitor multi-level boost power factor correction rectifier circuit comprises a three-phase, flying capacitor 3-level boost power factor correction rectifier circuit, wherein the determining comprises:

dividing the line cycle into six sixty-degree segments, wherein each of the six sixty-degree segments consists of one of three phase-to-neutral voltages at an absolute maximum voltage value relative to the other two phase-to-neutral voltages; and determining a current segment of the line cycle based on a comparison of voltage levels of the three phase-to-neutral voltages relative to zero.

5. The method of claim 4, wherein for the three-phase, flying capacitor 3-level boost power factor correction rectifier circuit, applying the additional phase shift comprises applying a phase shift of $T_{SW}/4$ to gate pulses provided to switches of one of the totem-pole legs that corresponds to the absolute maximum value of the phase-to-neutral voltage for the current segment.

6. The method of claim 1, wherein the three-phase, flying capacitor multi-level boost power factor correction rectifier circuit comprises a three-phase, flying capacitor 4-level boost power factor correction rectifier circuit, wherein the determining comprises:

level-shifting, by one-half an output voltage, three phase-to-neutral voltages of the three totem-pole legs for the line cycle; and determining which one of the three level-shifted phase-to-neutral voltages lies between one-third the output voltage and two-thirds the output voltage, inclusive.

7. The method of claim 6, wherein for the three-phase, flying capacitor 4-level boost power factor correction rectifier circuit, applying the additional phase shift comprises applying a phase shift of $T_{SW}/6$ to gate pulses provided to switches of one of the totem-pole legs corresponding to the level-shifted phase-to-neutral voltages that lies between one-third the output voltage and two-thirds the output voltage, inclusive.

8. The method of claim 1, wherein the three-phase, flying capacitor multi-level boost power factor correction rectifier circuit comprises a three-phase, flying capacitor 5-level boost power factor correction rectifier circuit, wherein determining comprises:

dividing the line cycle into six sixty-degree segments;

level-shifting, by one-half an output voltage, three phase-to-neutral voltages of the three totem-pole legs for the line cycle;

determining a current segment of the line cycle; and determining which of the three level-shifted phase-to-neutral voltages is less than or equal to one-fourth the output voltage, or greater than or equal to three-fourths the output voltage, for the current segment.

9. The method of claim 8, wherein for the three-phase, flying capacitor 5-level boost power factor correction rectifier circuit, applying the additional phase shift comprises applying a phase shift of $T_{SW}/8$ to gate pulses provided to switches of at least one of the totem-pole legs corresponding to the level-shifted phase-to-neutral voltage that is less than or equal to one-fourth the output voltage, or greater than or equal to three-fourths the output voltage, for the current segment.

10. A power factor correction rectifier, comprising:

a three-phase, flying capacitor multi-level boost power factor correction rectifier circuit comprising three totem-pole legs, one of the totem-pole legs comprising switches arranged in pairs with one pair coupled to a flying capacitor; and a control circuit configured to:

determine for which of at least one of a segment in a line cycle or a voltage level of a phase-to-neutral voltage, and for which totem-pole leg selected from the three totem-pole legs, to apply an additional phase shift at one or more instances of time in the line cycle; and apply the additional phase shift in such a way as to center align midpoint voltages of the three totem-pole legs, wherein the control circuit is configured to determine according to the level of the three-phase, flying capacitor multi-level boost power factor correction rectifier circuit.

11. The power factor correction rectifier of claim 10, wherein the control circuit is configured to apply the additional phase shift by applying the additional phase shift to gate pulses provided to the switches of only one of the three totem-pole legs associated with the at least one of the segment in the line cycle or the voltage level of the phase-to-neutral voltage at one or more instances of time.

12. The power factor correction rectifier of claim 11, wherein the control circuit is configured to apply the additional phase shift by selecting from one of two sets of pulse-width modulation pulses, wherein each set of the pulse-width modulation pulses is associated with one of two sets of carrier signals, the two sets of carrier signals comprising a phase shift of $T_{SW}/[2(N-1)]$, wherein each set of the two sets of carrier signals comprises N−1 carrier signals, and wherein each consecutive carrier signal is phase shifted by $T_{SW}/(N-1)$, where N is equal to a multi-level number.

13. The power factor correction rectifier of claim 10, wherein the three-phase, flying capacitor multi-level boost power factor correction rectifier circuit comprises a three-phase, flying capacitor 3-level boost power factor correction rectifier circuit, wherein the control circuit is configured to determine by:

dividing the line cycle into six sixty-degree segments, wherein each of the six sixty-degree segments consists of one of the three phase-to-neutral voltages at an absolute maximum voltage value relative to the other two phase-to-neutral voltages; and determining a current segment of the line cycle based on a comparison of voltage levels of the three phase-to-neutral voltages relative to zero.

14. The power factor correction rectifier of claim 13, wherein for the three-phase, flying capacitor 3-level boost power factor correction rectifier circuit, the control circuit is configured to apply the additional phase shift by applying a phase shift of $T_{SW}/4$ to gate pulses provided to the switches of one of the totem-pole legs that corresponds to the absolute maximum value of the phase-to-neutral voltage for the current segment.

15. The power factor correction rectifier of claim 10, wherein the three-phase, flying capacitor multi-level boost power factor correction rectifier circuit comprises a three-phase, flying capacitor 4-level boost power factor correction rectifier circuit, wherein the control circuit is configured to determine by:

level-shifting, by one-half an output voltage, three phase-to-neutral voltages of the three totem-pole legs for the line cycle; and determining which of the three level-shifted phase-to-neutral voltages lies between one-third the output voltage and two-thirds the output voltage, inclusive.

16. The power factor correction rectifier of claim 15, wherein for the three-phase, flying capacitor 4-level boost power factor correction rectifier circuit, the control circuit is configured to apply the additional phase shift by applying a phase shift of $T_{SW}/6$ to gate pulses provided to the switches of one of the totem-pole legs corresponding to the level-shifted phase-to-neutral voltages that lies between one-third the output voltage and two-thirds the output voltage, inclusive.

17. The power factor correction rectifier of claim 10, wherein the three-phase, flying capacitor multi-level boost power factor correction rectifier circuit comprises a three-phase, flying capacitor 5-level boost power factor correction rectifier circuit, wherein the control circuit is configured to determine by:

dividing the line cycle into six sixty-degree segments;

level-shifting, by one-half an output voltage, three phase-to-neutral voltages of the three totem-pole legs for the line cycle;

determining a current segment of the line cycle; and determining which of the three level-shifted phase-to-neutral voltages is less than or equal to one-fourth the output voltage, or greater than or equal to three-fourths the output voltage, for the current segment.

18. The power factor correction rectifier of claim 17, wherein for the three-phase, flying capacitor 5-level boost power factor correction rectifier circuit, the control circuit is configured to apply the additional phase shift by applying a phase shift of $T_{SW}/8$ to gate pulses provided to the switches of at least one of the totem-pole legs corresponding to the level-shifted phase-to-neutral voltage that is less than or equal to one-fourth the output voltage, or greater than or equal to three-fourths the output voltage, for the current segment.

* * * * *